(12) United States Patent
Iltchev et al.

(10) Patent No.: US 6,190,800 B1
(45) Date of Patent: Feb. 20, 2001

(54) LITHIATED MANGANESE DIOXIDE

(75) Inventors: Nikolay Iltchev, Norfolk; Paul A. Christian, Norton, both of MA (US); William L. Bowden, Nashua; Peter R. Moses, Windham, both of NH (US); Klaus Brandt, Wellesley, MA (US)

(73) Assignee: The Gillette Company, Boston, MA (US)

( * ) Notice: Under 35 U.S.C. 154(b), the term of this patent shall be extended for 0 days.

(21) Appl. No.: 09/496,233

(22) Filed: Feb. 1, 2000

Related U.S. Application Data

(63) Continuation-in-part of application No. 09/075,586, filed on May 11, 1998, now abandoned.

(51) Int. Cl.[7] .................................................. H01M 4/50
(52) U.S. Cl. ...................... 429/224; 429/231.95; 423/599
(58) Field of Search ............................. 429/224, 231.95; 423/599

(56) References Cited

U.S. PATENT DOCUMENTS

| | | |
|---|---|---|
| 2,956,860 | 10/1960 | Welch . |
| 4,133,856 | 1/1979 | Ikeda et al. ........................ 429/224 |
| 4,707,421 | 11/1987 | McVeigh, Jr. et al. ............. 429/94 |
| 4,758,484 | 7/1988 | Furukawa et al. ................. 429/224 |
| 4,921,689 | 5/1990 | Walker et al. ..................... 429/224 |
| 4,959,282 | 9/1990 | Dahn et al. ........................ 429/224 |
| 5,658,693 | 8/1997 | Thackery et al. .................. 429/224 |
| 5,698,176 | 12/1997 | Capparella et al. ............... 429/224 |
| 5,753,202 | * 5/1998 | Wang et al. ....................... 429/224 |
| 5,863,675 | 1/1999 | Capparella et al. ............... 429/224 |
| 6,054,010 | * 4/2000 | Tanaka et al. ..................... 429/209 |

FOREIGN PATENT DOCUMENTS

| | | |
|---|---|---|
| 52-73328 | 6/1977 | (JP) . |
| 62-160657 | 7/1987 | (JP) . |
| 1-272051 | 10/1989 | (JP) . |
| 8-115728 | 5/1996 | (JP) . |
| 8-213018 | 8/1996 | (JP) . |

OTHER PUBLICATIONS

A. Kozawa, in "Batteries", K.V. Kordesch, ed. vol. 1, 1974, pp. 433–488.

Roger Burns and Virginia Burns, Manganese Dioxide Symposium, vol. 1, 1975, (Paper No. 16) pp. 306–327.

Paul Ruetschi & R. Giovanoli, J.ournal of the Electrochemical Society, vol. 135, 1988, pp. 2663–2669.

Paul Ruetschi, Journal of the Electrochemical Society, vol. 131, 1984, pp. 2737–2744.

Hironsuke Ikeda, et. al. Manganese Dioxide Symposium, vol. 1, 1975, pp. 384–401.

Young Lee, et. al., Journal of the American Chemical Society, vol. 120, 1998, pp. 12601–12613.

Nikolay Iltchev et. al., Journal of Power Sources, vol. 35, 1991, pp. 175–181.

* cited by examiner

*Primary Examiner*—Laura Weiner
(74) *Attorney, Agent, or Firm*—Barry D. Josephs; Paul I. Douglas; Thomas G. Krivulka

(57) ABSTRACT

A lithiated manganese dioxide for use in primary lithium electrochemical cells. The lithiated manganese dioxide is prepared by stepwise treatment with a liquid source of lithium cations that can include an aqueous solution of a lithium base or a low melting point lithium salt resulting in formation of a lithiated manganese dioxide product. Lithium cations in the lithium base or molten lithium salt can be ion-exchanged with hydrogen ions in the manganese dioxide crystal lattice and additional lithium ions reductively inserted into the lattice during subsequent heat-treatment to form the lithiated manganese dioxide product $Li_yMnO_{2-\delta}$. The primary lithium cell utilizing the lithiated manganese dioxide product as active cathode material exhibits increased operating voltage and enhanced high rate, low temperature, and pulse discharge performance compared with untreated manganese dioxide.

37 Claims, 9 Drawing Sheets

LITHIATED MANGANESE DIOXIDE

CROSS REFERENCE TO RELATED APPLICATIONS

This application is a continuation-in-part of patent application U.S. Ser. No. 09/075,586, filed on May 11, 1998, now abandoned.

FIELD OF THE INVENTION

This invention relates to a method for preparing an improved lithiated manganese dioxide having a stabilized gamma-$MnO_2$-type structure. In particular, the invention relates to a lithiated manganese dioxide having a stabilized gamma-$MnO_2$-type structure and its application as an active cathode material in a primary lithium electrochemical cell.

BACKGROUND OF THE INVENTION

Electrochemical cells commonly contain a negative electrode (anode) and a positive electrode (cathode), an ion-permeable separator therebetween and an electrolyte in contact with both of the electrodes. Typical electrolytes can be aqueous-based or non-aqueous organic solvent-based liquid electrolytes or polymeric electrolytes. There are two basic types of electrochemical cells, a primary and a secondary (rechargeable) electrochemical cell. A primary electrochemical cell is discharged to exhaustion only once. A secondary electrochemical cell, however, is rechargeable and thus can be discharged and recharged multiple times.

Primary lithium electrochemical cells typically employ an anode of lithium metal or lithium alloy, preferably a lithium-aluminum alloy; a cathode containing an electrochemically active material consisting of a transition metal oxide or chalcogenide, preferably manganese dioxide; and an electrolyte containing a chemically stable lithium salt dissolved in an organic solvent or a mixture of organic solvents.

The lithium anode is preferably formed from a sheet or foil of lithium metal or lithium alloy without any substrate. A lithium primary cell referenced hereinafter as having an anode comprising lithium shall be understood to mean an anode of lithium metal or a lithium alloy. If a lithium-aluminum alloy is employed, the aluminum is present in a very small amount, typically less than about 1 wt % of the alloy. The addition of aluminum primarily serves to improve the low temperature performance of the lithium anode in lithium primary cells.

Manganese dioxides suitable for use in lithium primary cells include both chemically produced manganese dioxide known as "chemical manganese dioxide" or "CMD" and electrochemically produced manganese dioxide known as "electrolytic manganese dioxide" or "EMD". CMD can be produced economically and in high purity, for example, by the methods described by Welsh et al. in U.S. Pat. No. 2,956,860. However, CMD typically does not exhibit energy or power densities in lithium cells comparable to those of EMD. Typically, EMD is manufactured commercially by the direct electrolysis of a bath containing manganese sulfate dissolved in a sulfuric acid solution. Processes for the manufacture of EMD and representative properties are described in "Batteries", edited by Karl V. Kordesch, Marcel Dekker, Inc., New York, Vol. 1, 1974, pp.433–488. Manganese dioxide produced by electrodeposition typically is a high purity, high density, "gamma($\gamma$)-$MnO_2$" phase, which has a complex crystal structure containing irregular intergrowths of a "ramsdellite"-type $MnO_2$ phase and a smaller portion of a beta($\beta$)- or "pyrolusite"-type $MnO_2$ phase as described by dewolfe (*Acta Crystallographica*, 12, 1959, pp.341–345). The gamma($\gamma$)-$MnO_2$ structure is discussed in more detail by Burns and Burns (e.g., in "Structural Relationships Between the Manganese (IV) Oxides", *Manganese Dioxide Symposium*, 1, The Electrochemical Society, Cleveland, 1975, pp. 306–327), which is incorporated herein by reference.

The structural disorder present in the crystal lattice of gamma($\gamma$)-$MnO_2$ includes non-coherent lattice defects, such as stacking faults, micro-twinning, $Mn^{+4}$ cation vacancies, $Mn^{+3}$ cations from reduction of $Mn^{+4}$ cations, lattice distortion introduced by the $Mn^{+3}$ cations (i.e., Jahn-Teller effect), as well as compositional non-stoichiometry as described, for example, by Chabré and Pannetier (*Prog. Solid State Chem.*, Vol. 23, 1995, pp. 1–130) and also by Ruetschi and Giovanoli (*J. Electrochem. Soc.*, 135(11), 1988, pp. 2663–9), both incorporated herein by reference.

Ruetschi has proposed a chemical formula for $\gamma$-$MnO_2$ which is based on a structural defect model (*J. Electrochem. Soc.*, 131(12), 1984, pp. 2737–2744). In this model, the crystal lattice structure of $\gamma$-$MnO_2$ can be described as comprising an anion sublattice consisting of a close-packed array of oxygen anions and a corresponding cation sublattice consisting of an array of predominantly $Mn^{+4}$ cations, some $Mn^{+3}$ cations, and occasional $Mn^{+4}$ cation vacancies. Further, in order to maintain overall electroneutrality of the $\gamma$-$MnO_2$ crystal lattice, the positive charge deficiencies resulting from the presence of $Mn^{+3}$ cations as well as the $Mn^{+4}$ cation vacancies must be compensated. This can be accomplished by substitution of $OH^-$ (hydroxyl) ions for $O^{-2}$ ions in the anion sublattice, which is nominally equivalent to protonation of $O^{-2}$ anions by hydrogen ions. Thus, for each $Mn^{+3}$ cation present, one hydrogen ion must be introduced into the lattice to maintain charge compensation. Similarly, for each $Mn^{+4}$ cation vacancy, four hydrogen ions must be introduced to maintain the overall electroneutrality. The $OH^-$ anions formed are also referred to as "structural" or "lattice water". Thus, the chemical formula for $\gamma$-$MnO_2$ can be represented as:

$$Mn^{+4}_{1-x-y}Mn^{+3}_y\square_xO_{2-4x-y}(OH)_{4x+y} \qquad (1)$$

wherein $\square$ stands for $Mn^{+4}$ vacancies; x is the fraction of $Mn^{+4}$ vacancies; and y is the fraction of $Mn^{+3}$ cations. Also, Reutschi has proposed that hydrogen ions associated with the $Mn^{+3}$ cations are mobile while hydrogen ions associated with the immobile $Mn^{+4}$ cation vacancies are localized.

It is theorized by the Applicants herein of the present Patent Application that such mobile hydrogen ions present in the $\gamma$-$MnO_2$ lattice can be advantageously substituted by lithium cations by way of an ion-exchange process prior to the traditional heat-treatment without further reduction of $Mn^{+4}$ to $Mn^{+3}$, in contrast to typical reductive lithium insertion processes of prior art. Although Reutschi has proposed that such hydrogen ions are mobile, neither a particular process for ion-exchanging the mobile hydrogen ions by lithium cations nor the desirability of such an ion-exchange process was disclosed.

Ruetschi further theorized that the number of mobile hydrogen ions depends on both the degree of oxidation of the manganese atoms and total lattice water content and can be determined experimentally. For example, it is theorized by the Applicants herein of the present Patent Application that according to Equation (1) hereinabove, about 20% of the lattice hydrogen ions of an EMD having a nominal chemical formula of $MnO_{1.96} \cdot 0.23 H_2O$, for example, can be ion-exchanged by lithium cations as shown in Equation (2):

$$Li^+ + Mn^{+4}_{0.84}Mn^{+3}_{0.73}\square_{0.087}O_{1.579}(OH)_{0.421} \Rightarrow Li_{0.08}MnO_2 \cdot 0.18 H_2O \quad (2)$$

Electrochemical manganese dioxide (EMD) is the preferred manganese dioxide for use in primary lithium cells. However, before it can be used, it must be heat-treated to remove residual water. The term "residual water", as used herein includes surface-adsorbed water, noncrystalline water (i.e., water physisorbed or occluded in pores), as well as lattice water. Heat-treatment of EMD prior to its use in lithium cells is well known and has been described by Ikeda et al. (e.g., in "Manganese Dioxide as Cathodes for Lithium Batteries", *Manganese Dioxide Symposium*, Vol. 1, The Electrochemical Society, Cleveland, 1975, pp. 384–401) and is incorporated herein by reference.

EMD suitable for use in primary lithium cells can be heat-treated at temperatures between about 200 and 350° C. as taught by Ikeda et al. in U.S. Pat. No. 4,133,856. This reference also discloses that it is preferable to heat-treat the EMD in two steps. The first step is performed at temperatures up to about 250° C. in order to drive off surface and non-crystalline water. The EMD is heated in a second step to a temperature between about 250 and 350° C. to remove the lattice water. This two-step heat-treatment process improves the discharge performance of primary lithium cells, primarily because surface, non-crystalline, and lattice water are all removed. An undesirable consequence of this heat-treatment process is that EMD having the $\gamma$-$MnO_2$-type structure, is gradually converted to EMD having a gamma/beta ($\gamma/\beta$)-$MnO_2$-type structure. The term "gamma/beta-$MnO_2$" as used in the art reflects the fact (as described by Ikeda et al.) that a significant portion of the $\gamma$-$MnO_2$ (specifically, the ramsdellite-type $MnO_2$ phase) is converted to $\beta$-$MnO_2$ phase during heat-treatment. At least about 30 percent by weight and typically between about 60 and 90 percent by weight of the ramsdellite-type $MnO_2$ phase is converted to $\beta$-$MnO_2$ during conventional heat treatment of $\gamma$-$MnO_2$ as taught, for example, in U.S. Pat. No. 4,921,689. The resulting $\gamma/\beta$-$MnO_2$ phase is less electrochemically active than an EMD in which the $\gamma$-$MnO_2$ phase contains a higher fraction of ramsdellite-type $MnO_2$ relative to $\beta$-$MnO_2$. Thackeray et al. have disclosed in U.S. Pat. No. 5,658,693 that cathodes containing such $\beta$-$MnO_2$-enriched phases exhibit less capacity for lithium uptake during discharge in lithium cells.

One consequence of the electrodeposition process used to prepare EMD is that the formed EMD typically contains residual surface acidity from the sulfuric acid of the electrolytic bath. This residual surface acidity must be neutralized, for example, with basic aqueous solution, before the EMD can be used in cathodes for primary lithium cells. Suitable aqueous bases include: sodium hydroxide, ammonium hydroxide (i.e., aqueous ammonia), calcium hydroxide, magnesium hydroxide, potassium hydroxide, lithium hydroxide, and combinations thereof. Typically, commercial EMD is neutralized with a strong base such as sodium hydroxide because it is highly effective and economical.

An undesirable consequence of the acid neutralization process is that alkali metal cations can be introduced into ion-exchangeable sites on the surface of the EMD particles. For example, when sodium hydroxide is used for acid neutralization, sodium cations can be trapped in the surface sites. This is especially undesirable for EMD used in cathodes of primary lithium cells because during cell discharge the sodium cations can be released into the electrolyte, deposit onto the lithium anode, and degrade the lithium passivating layer. Further, the deposited sodium cations can be reduced to sodium metal, react with the organic electrolyte solvents, and generate gas, thereby substantially decreasing the storage life of the cells.

A process for converting commercial grade EMD that has been neutralized with sodium hydroxide to the lithium neutralized form is disclosed by Capparella et al. in U.S. Pat. No. 5,698,176 and related Divisional U.S. Pat. No. 5,863,675. The disclosed process includes the steps of: (a) mixing sodium hydroxide neutralized EMD with an aqueous acid solution to exchange the sodium cations with hydrogen ions and produce an intermediate with reduced sodium content; (b) treating the intermediate with lithium hydroxide or another basic lithium salt to exchange the hydrogen ions with lithium cations; (c) heat-treating the lithium ion-exchanged EMD at a temperature of at least about 350° C. to remove residual water. However, Capparella et al. disclose that "contacting particulate EMD with high pH lithium hydroxide solution may also serve to introduce lithium ions into the crystal lattice of the $MnO_2$, thereby altering the crystal structure into a form which is not useful as a cathode active material". Further, Capparella et al. specifically teach against treatment of an aqueous suspension of EMD with lithium hydroxide to a final pH greater than 7.5 since such treatment was disclosed to destroy EMD particle integrity and produce sub-micron size $MnO_2$ particles that were difficult to process.

A method for preparing a lithiated manganese dioxide and its use in electrochemical cells is disclosed by Dahn et al. in U.S. Pat. No. 4,959,282. The disclosed method involves the steps of: (a) forming a slurry of EMD in an aqueous solution of a lithium salt selected from LIOH, $Li_2O$, and $LiNO_3$ at room temperature; (b) evaporating water from the stirred slurry at 100° C. to obtain a dry intermediate having lithium salt deposited on particle surfaces as well as within pores; (c) heat-treating the dry intermediate at between 300 and 450° C. for about 30 minutes to obtain a lithiated manganese dioxide having the formula $Li_yMnO_2$, wherein y is about 0.33 to 0.43. During heat-treatment, the $\gamma$-$MnO_2$ crystal structure was disclosed to convert to a new structure related to that of $\gamma$-$MnO_2$ having lithium ions intercalated in the crystal lattice that was referred to as "X-phase". However, the disclosed method produces a lithium manganese oxide having substantially higher lithium content than the lithiated manganese dioxide of the present invention.

Wang et al. disclosed a method for preparing lithium manganese oxide having a spinel-type structure in U.S. Pat. No. 5,753,202. As described therein, the spinel lithium manganese oxide is intended for use in lithium rechargeable cells, specifically lithium ion rechargeable cells. The disclosed method involves the steps of: (a) treating a manganese oxide (e.g., EMD) with a lithium salt (e.g., lithium hydroxide or nitrate) either in aqueous solution or in the solid state at a temperature between about 4 and 400° C. to form an intermediate lithiated manganese oxide (e.g., $Li_xMnO_2$, 0.015<x<0.2); (b) heating the intermediate at between about 550 and 600° C. to form a lithium manganese sesquioxide (viz., $Li_xMn_2O_3$); (c) mixing the sesquioxide with additional lithium salt (e.g., $Li_2CO_3$); (d) heating the mixture at between about 650 and 900° C. to form a lithium manganese oxide having a spinel structure. The disclosed method is distinguishable over that of the present invention in that the method of the present invention does not produce any detectable amount of lithium manganese oxide having a spinel structure. Also, the lithiated manganese dioxide of the present invention is applied directly as a cathode active material in a primary lithium cell, in distinction to the intermediate lithiated manganese oxide of Wang et al. that must be converted to a lithium manganese oxide having a spinel structure before inclusion in the cathode of a lithium ion rechargeable cell. Furthermore, there was no contemplation of using the intermediate product of Wang et al. as a cathode active material in a primary lithium cell.

A method for preparing a manganese dioxide consisting essentially of ramsdellite-type $MnO_2$ containing a minor portion of $\beta$-$MnO_2$ and the use thereof as an active cathode material is disclosed in U.S. Pat. No. 5,658,693.

The preferred method includes the steps of: (a) heating a stoichiometric lithium manganese oxide (e.g., $LiMn_2O_4$) having a spinel structure in 2.6M aqueous sulfuric acid at 95° C. for 2 days; (b) separating the intermediate product from the liquid; (c) drying the intermediate product overnight at 100° C.; (d) heat-treating the intermediate product at a temperature below 400° C. However, heat-treatment above about 300° C. is disclosed to cause conversion of the ramsdellite-type $MnO_2$ to $\beta$-$MnO_2$. It was further disclosed that heat-treatment at temperatures above 300° C. but less than about 370° C. in the presence of a lithium salt such as $LiOH$ or $LiNO_3$ produces a lithium-stabilized ramsdellite-type $MnO_2$ having the nominal composition $Li_{2x}MnO_{2+x}$, wherein $0 \leq x \leq 0.2$, with only a minor portion of $\beta$-$MnO_2$ present. However, the disclosed method is overly complicated and inefficient to permit commercialization.

A method for preparing a lithiated manganese oxide has been disclosed in unexamined Japanese patent application JP62-160657, wherein a manganese dioxide was immersed in a highly alkaline aqueous solution containing $\geq 0.5M$ lithium ions at room temperature for 100 hours, collected, washed with water, and heat-treated at between 360° C. and 430° C. for 20 hours. Another related method for preparing a lithiated manganese oxide was disclosed in Japanese patent application JP52-073328, wherein EMD powder was immersed for about 24 hours in a saturated aqueous solution of lithium hydroxide, separated by filtration, and heat-treated at between 200 and 400° C. for about four hours. A lithium button cell containing the lithiated EMD was disclosed to give a very flat discharge curve with less decrease in capacity after room temperature storage for one year than heat-treated EMD not immersed in lithium hydroxide solution.

Furukawa et al. in U.S. Pat. No. 4,758,484 claim a method for preparing a composite cathode material for lithium rechargeable cells wherein a mixture of manganese dioxide and a lithium salt selected from lithium hydroxide, lithium nitrate, lithium phosphate, lithium carbonate, and lithium oxide, having a Li/Mn mole ratio of from 0.11 to 2.33, is heat-treated at between 300 and 430° C., preferably 350 and 430° C. The product was disclosed to include a mixture of electrochemically non-active $Li_2MnO_3$ and active lithiated manganese dioxide.

Treatment of a mixture of a manganese dioxide and lithium hydroxide or another lithium salt in a Li/Mn mole ratio of from 1:99 to 30:70 at a temperature between 170 and 280° C. was disclosed in unexamined Japanese patent publication Hei 8-213018. A primary lithium cell including the treated product was disclosed to give discharge capacity greater than that for untreated manganese dioxide. In distinction with the present invention, the reference does not teach heat-treatment at temperatures greater than 280° C. and, in fact, discourages heat-treatment at temperatures above 300° C. However, related Japanese Patent Application JP08-115728 discloses sintering a mixture of manganese dioxide and a lithium salt selected from $LiOH$, $Li_2CO_3$, $LiNO_3$, and $Li_2O$ at a temperature between 150 and 400° C. The resulting "surface-improved" manganese dioxide containing about 1 to 15 mole % Li was included in the cathode of a primary lithium cell and disclosed to provide improved low temperature (–20° C.) performance. The reference also teaches that manganese dioxide having lithium content <1 mole % does not provide improved low temperature performance, whereas lithium content >15 mole % decreases discharge capacity.

In yet another method for preparing active cathode materials for nonaqueous secondary cells claimed in unexamined Japanese Patent Application JP01-272051, $MnO_2$ powder is heated with a lithium salt above the melting point of the lithium salt but below 430° C. Suitable lithium salts are claimed to include $LiNO_3$, $LiClO_4$, $LiBH_4$, and $LiNH_2$. However, since $LiBH_4$ and $LiNH_2$ are well known to be very strong reducing agents and $MnO_2$ is a very strong oxidizing agent, the claimed high temperature sintering is expected to result in a strongly exothermic reaction. Further, at the preferred Li/Mn mole ratios of from 0.11 to 2.33, the product is disclosed to contain a substantial amount of electrochemically non-active $Li_2MnO_3$ as a second phase.

Thus, even though considerable effort has been expended, as evidenced by the cited prior art, the methods used to prepare active cathode materials including both lithium and manganese dioxide require additional refinement in order to substantially improve performance of primary electrochemical cells incorporating such active cathode materials.

SUMMARY OF THE INVENTION

It is a principal object of the invention to produce a lithiated manganese dioxide having the properties of improved discharge performance of primary lithium cells when the lithiated manganese dioxide is employed as the active cathode material therein.

The present invention features a process for preparing an improved lithiated manganese dioxide having a lithium-stabilized $\gamma$-$MnO_2$-type structure and the use of the lithiated manganese dioxide produced thereby as the active cathode material in a lithium primary electrochemical cell.

The lithiated manganese dioxide can be prepared by treatment of manganese dioxide, for example, electrolytic manganese dioxide (EMD), with a liquid source of lithium cations by methods that promote ion-exchange of hydrogen ions located in internal crystallographic lattice sites as well as in surface sites of the EMD particles with lithium cations followed in a separate step by a heat-treatment to eliminate residual or occluded water. The lithiated manganese dioxide formed has a stabilized $\gamma$-$MnO_2$-type crystal structure suitable for use as active cathode material in a primary lithium cell. The operating voltage during discharge of the lithium primary cell of the present invention is substantially higher than that of primary lithium cells containing manganese dioxide not treated with a liquid source of lithium cations and subsequently heat-treated to eliminate residual water.

Further, the process of the present invention seeks to improve the lithiated manganese dioxide in a manner that preserves the concentration of $Mn^{+4}$ cations. This can be accomplished by inserting the lithium cations into the manganese dioxide crystal lattice predominantly via ion-exchange with hydrogen ions rather than insertion of lithium cations from surface lithium salts during heat-treatment, which can result in undesirable reduction of $Mn^{+4}$.

Thus, in one aspect of the invention, manganese dioxide in a preferred form of EMD known in the art as "lithium grade" EMD is used in the process of the invention. Lithium grade EMD having a $\gamma$-$MnO_2$-type crystal structure, a sodium content of less than 2000 ppm, preferably less than 500 ppm, and a lithium content of less than 600 ppm is used in a preferred multi-step process including the following steps:

(1) Manganese dioxide is placed in a liquid with stirring to form a suspension or slurry. The manganese dioxide can be EMD. The liquid can be deionized or distilled water;

(2) A strongly basic lithium salt, such as lithium hydroxide, is added to the aqueous suspension of EMD as a solid. The pH of the EMD suspension can be increased initially by addition of portions of solid lithium hydroxide until a pH of greater than about 7.5, desirably between about 7.5 and 9, preferably between about 7.7 and 9 is obtained. Such soaking neutralizes acidic sites on the manganese dioxide, particularly, the acidic sites on the surface of the EMD. The stirred suspension can be soaked initially at the preferred pH for at least about 15 minutes, preferably for at least about 30 minutes; that is, between about 10% and 50% of the total soaking time, preferably for between about 10% and 30% of the total soaking time; and at a temperature between about 15 and 35° C., preferably 20 and 30° C. Total soaking time can be typically between about 2 and 24 hours, preferably about 4 and 12 hours.

(3) After the initial soaking time, the pH of the mixture can be increased by adding additional portions of the basic lithium salt until an elevated pH of between about 10 and 13, preferably between about 11 and 13 is reached. The stirred suspension is soaked for the remainder of the total soaking time at a temperature between about 15 and 35° C., preferably about 20 and 30° C. The suspension can be maintained at the elevated pH, typically by adding small portions of the basic lithium salt, for example, at intervals of about every 15 to 30 minutes. During the course of this soaking (step 3), hydrogen ions in the EMD crystal lattice are ion-exchanged by lithium cations to form a lithiated manganese dioxide intermediate product having a chemical composition of $Li_xMnO_2$, wherein $0.05 \leq x \leq 0.125$.

(4) The intermediate product is separated from the liquid by filtering, decanting, centrifuging or spray-drying the suspension, evaporating the liquid or combinations thereof. The intermediate product can be collected in the form of a solid sediment, a filtercake, free-flowing particles or as an aggregation or agglomeration of particles.

(5) The collected intermediate product is heat-treated in an essentially oxidizing atmosphere, such as air or oxygen, at a temperature of between about 300 and 420° C., preferably 350 and 390° C., for a period of time of between about 2 and 12 hours, preferably between 4 and 8 hours, to produce a heat-treated, lithiated manganese dioxide product having the nominal composition $Li_yMnO_{2-\delta}$, wherein $0.075 \leq y \leq 0.175$ and $0.01 \leq \delta \leq 0.06$.

(6) The heat-treated lithiated manganese dioxide product can be advantageously included in a primary lithium cell as the active cathode material therein.

If EMD having a $\gamma$-$MnO_2$ structure is employed, the heat-treated, lithiated manganese dioxide product has essentially the same crystal structure as the EMD starting material. That is, the heat-treatment of step 5 hereinabove does not convert appreciably the $\gamma$-$MnO_2$ structure of the lithiated manganese dioxide to the $\gamma/\beta$-$MnO_2$ structure as would be expected in the absence of lithium cations ion-exchanged into the crystal lattice (i.e., heat-treated commercial EMD). Typically, less than about 5 wt % of additional $\beta$-$MnO_2$ phase can be detected by x-ray powder diffraction analysis after the heat-treatment of step (5). Further, the heat-treatment of step (5) does not produce an amount of lithium manganese oxides having spinel, rocksalt or other related crystal structures detectable by x-ray powder diffraction analysis.

The above indicated process has the additional advantage that during the second soaking (step 3) hydrogen ions in the EMD crystal lattice are ion-exchanged by lithium cations. In the course of ion-exchange, the average oxidation state of the manganese cations within the EMD crystal lattice essentially remains unchanged. More lithium cations can be introduced into the manganese dioxide crystal lattice by extending the soaking time or by optionally increasing the soaking temperature.

In another aspect, the present invention features a method for preparing the lithiated manganese dioxide by a process involving thermal treatment of an essentially dry mixture of manganese dioxide and a low melting point lithium salt or alternatively, a mixture of low melting point lithium salts or a low melting point eutectic mixture of lithium salts. Thus, the term "lithium salt mixture" as used herein relating to the process of the present invention is intended to mean a single lithium salt, a mixture of one or more lithium salts or a eutectic mixture of lithium salts. The low melting point lithium salt mixture can serve as a liquid ion-exchange medium whereby lithium cations can ion-exchange with hydrogen ions of the manganese dioxide crystal lattice. Lithium grade EMD having a $\gamma$-$MnO_2$ crystal structure, a sodium content of less than 2000 ppm, preferably less than 500 ppm, and a lithium content of less than 600 ppm and a low melting point lithium salt mixture is used in a preferred multi-step process including the following steps:

(1) Manganese dioxide powder is intimately dry-blended with a suitable amount of solid, low melting point lithium salt mixture to form a reaction precursor mixture. Desirably, enough lithium salt mixture is added to the manganese dioxide so that the molar ratio of Li/Mn in the reaction mixture is between about 0.05 and 0.175. The lithium salt mixture desirably has a melting point less than about 350° C. and can be lithium nitrate.

(2) The reaction mixture is heated for a specified period of time, desirably between about 2 and 12 hours at a temperature above the melting point of the lithium salt mixture, but lower than about 350° C. and produce a lithiated manganese dioxide intermediate reaction product having the chemical composition $Li_xMnO_2$ wherein $0.05 \leq x \leq 0.175$ thereby.

(3) The intermediate reaction product is heat-treated in an oxidizing atmosphere, such as air or oxygen, to a temperature greater than about 350° C. but less than about 420° C. and held at that temperature for a period of time, desirably between about 4 and 12 hours, to remove any residual or occluded water. A heat-treated lithiated manganese dioxide product having the chemical composition $Li_yMnO_{2-\delta}$, wherein $0.05 \leq y \leq 0.175$ and $0.01 \leq \delta \leq 0.06$ is produced thereby.

(4) The heat-treated lithiated manganese dioxide can be advantageously inserted into a primary lithium cell for use as cathode active material therein.

The reaction mixture including EMD and a lithium salt mixture is heated for a period of time initially at a temperature above the melting point of the lithium salt mixture but lower than about 350° C. in order to form a liquid phase that can flow into pores in and between the EMD particles, wet the surfaces of the EMD particle, and form a liquid-solid interface, thereby providing diffusion pathways for ion-exchange. The lithium ion-exchanged EMD is heat-treated for a period of time at a temperature greater than about 350° C. but less than about 420° C. in order to remove any residual water and form the lithiated manganese dioxide product. If EMD having a $\gamma$-$MnO_2$ structure is employed, the heat-treated lithiated manganese dioxide product has essentially the same crystal structure as the starting EMD.

That is, the heat-treatment of step 3 hereinabove essentially does not convert the $\gamma$-$MnO_2$ structure to the $\gamma/\beta$-$MnO_2$ structure as expected in the absence of the lithium cations (i.e., heat-treated commercial EMD). Typically less than 1 wt % of the ramsdellite-type $MnO_2$ phase in the $\gamma$-$MnO_2$ structure is converted to the $\beta$-$MnO_2$ phase. Further, the heat-treatment of step 3 does not produce an appreciable amount of lithium manganese oxide having spinel, rocksalt or other related structures.

In yet another aspect, the invention features an electrochemical cell including a cathode, an anode, and an electrolyte. The anode can be lithium metal, a lithium alloy or a lithium-insertion compound. The cathode can include a lithiated manganese dioxide prepared by the method of this invention. The electrolyte can be a solution of an electrochemically stable lithium salt dissolved in one or more suitable organic solvents. The lithium salt can be lithium trifluoromethanesulfonate. Suitable organic solvents include ethylene carbonate, propylene carbonate, and 1,2-dimethoxyethane and combinations thereof. The cell can have an average operating voltage of greater than about 2.9V.

The lithiated manganese dioxide prepared by the method of the present invention can provide the following advantages. When included in the cathode of a lithium primary electrochemical cell, the lithiated manganese dioxide can provide increased initial and average operating voltages compared with lithium primary cells of prior art. Typically, when conventional lithium primary cells are discharged at high rate, at low temperature or at high rate at low temperature, the operating voltage is depressed. Accordingly, use of such cells in demanding applications, for example, in compact, high performance still photographic cameras including advanced photographic system (APS) cameras, video camcorders or digital still cameras can be limited severely. However, lithium primary cells including cathodes containing lithiated manganese dioxide prepared by the method of the present invention exhibit much higher operating voltages at high discharge rates and at low temperatures, than lithium primary cells of prior art.

Other features and advantages of the present invention will be apparent from the description of the preferred embodiments and from the claims.

DETAILED DESCRIPTION

Figure 1:
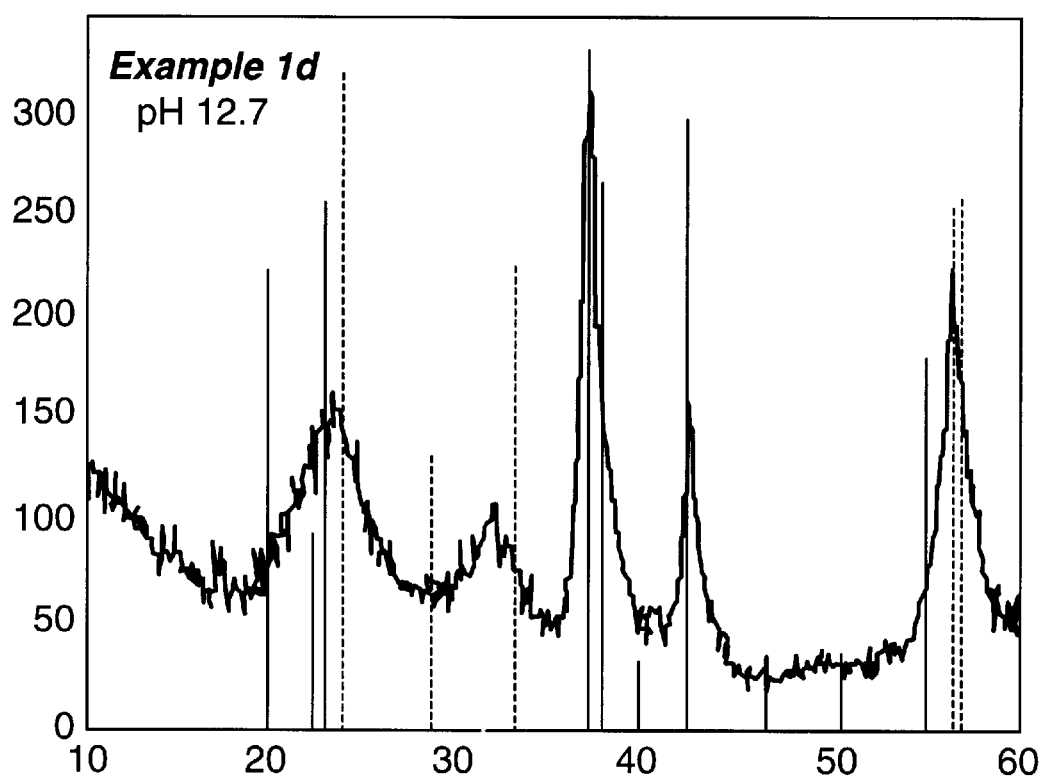
FIG. 1 is a graph depicting the x-ray powder diffraction pattern for the lithiated manganese dioxide prepared from a suspension having a pH value of about 12.7.

The present invention features a method for preparing a lithiated manganese dioxide having a gamma($\gamma$)-$MnO_2$-type crystal structure whereby manganese dioxide having a $\gamma$-$MnO_2$-type crystal structure, for example, an electrolytic manganese dioxide (EMD) is treated with a liquid ion-exchange medium containing lithium cations such that most of the hydrogen ions (viz., protons) located in surface and crystal lattice sites of the EMD can be ion-exchanged by lithium cations. Furthermore, the heat-treated lithiated manganese dioxide product essentially retains the $\gamma$-$MnO_2$-type crystal structure of the reactant manganese dioxide.

In the process of the invention, insertion of lithium cations into manganese dioxide having a $\gamma$-$MnO_2$ crystal structure by ion-exchange with hydrogen ions present within the manganese dioxide crystal lattice has been determined to be highly desirable. These hydrogen ions typically can be present in the oxygen anion sublattice in the form of hydroxyl anions (i.e., $OH^-$). In accordance with a principal aspect of the invention, lithium cations are introduced into the manganese dioxide crystal lattice in a soaking step by ion-exchange with the hydrogen ions. During such ion exchange, the manganese oxidation state is unchanged relative to the manganese oxidation state in the starting reactant manganese dioxide. However, in the process of the invention, additional lithium cations can be introduced into the manganese dioxide crystal lattice during extended soaking and subsequent heat-treatment. Although the heat-treatment functions to remove residual water from the lithiated manganese dioxide, an undesirable consequence of the heat-treatment is that the average manganese oxidation state can be decreased slightly by the insertion of lithium cations from residual lithium salt (e.g., LiOH, $Li_2CO_3$) on the surface of the manganese dioxide particles as well as by oxygen loss from the manganese dioxide at high temperatures.

It should be appreciated that two lithiated manganese dioxide products can have the same chemical composition or formula and yet still can have substantially different electrochemical properties because of differences in the crystal lattice structure, particularly in the distribution and location of lithium ions within the crystal lattice, as well as manganese oxidation state. Thus, the specific method used to prepare a lithiated manganese dioxide can significantly influence the electrochemical properties of the final product.

In one embodiment of the present invention, manganese dioxide, preferably electrolytic manganese dioxide (EMD) having a γ-$MnO_2$ crystal structure, a sodium content of less than about 2000 ppm, preferably less than about 500 ppm, and a lithium content of less than about 600 ppm (known in the art as "lithium grade" EMD), is lithiated in a multi-step process including treatment with an aqueous solution comprising a basic lithium salt. The preferred multi-step process includes the following steps:

(1) Manganese dioxide is placed in a liquid with stirring to form a suspension or slurry. The manganese dioxide can be EMD. The liquid can be deionized or distilled water;

(2) A strongly basic lithium salt, such as lithium hydroxide, is added to the aqueous suspension of EMD as a solid. The pH of the EMD suspension can be increased initially by addition of portions of solid lithium hydroxide until a pH of greater than about 7.5, desirably between about 7.5 and 9, preferably between about 7.7 and 9 is obtained. Such soaking neutralizes acidic sites on the surface of the manganese dioxide, particularly, the acidic sites on the surface of EMD. The stirred suspension can be soaked initially at the preferred pH for at least about 15 minutes, preferably for at least about 30 minutes; that is, between about 10% and 50% of the total soaking time, preferably between about 10% and 30% of the total soaking time; and at a temperature between about 15 and 35° C., preferably 20 and 30° C. Total soaking time can be typically between about 2 and 24 hours, preferably between about 4 and 12 hours.

(3) After the initial soaking time, the pH of the mixture can be increased by adding additional portions of the basic lithium salt until an elevated pH of between about 10 and 13, preferably between about 11 and 13 is reached. The stirred suspension is soaked for the remainder of the total soaking time at a temperature between about 15 and 100° C., preferably about 20 and 35° C. The suspension can be maintained at the elevated pH, typically by adding small portions of the basic lithium salt, for example, at intervals of about every 15 to 30 minutes. During the course of this soaking (step 3), hydrogen ions in the EMD crystal lattice are ion-exchanged by lithium cations to form a lithiated manganese dioxide intermediate product having the nominal formula $Li_xMnO_2$, wherein $0.025 \leq x \leq 0.125$.

(4) The intermediate product is separated from the liquid by filtering, decanting, centrifuging or spray-drying the suspension, evaporating the liquid or combinations thereof. The intermediate product can be collected in the form of a powder, sediment, filtercake, free-flowing particles or as an aggregation or agglomeration of particles.

(5) The collected intermediate product is heat-treated in an essentially oxidizing atmosphere, such as air or oxygen, at a temperature between about 300 and 420° C., preferably between 350 and 390° C., for a period of time between 2 and 12 hours, preferably between 4 and 8 hours, to produce the heat-treated, lithiated manganese dioxide product having the chemical composition $Li_yMnO_{2-\delta}$, wherein $0.075 \leq y \leq 0.175$ and $0.01 \leq \delta \leq 0.06$.

(6) The heat-treated lithiated manganese dioxide product can be advantageously included in a primary lithium cell as the active cathode material therein.

In the first stage of the lithiation process, hydrogen ions in the manganese dioxide lattice are ion-exchanged with lithium cations. Initially, a suspension or slurry of the manganese dioxide powder in water is treated with a basic lithium salt, such as lithium hydroxide, lithium oxide, lithium methoxide or lithium amide, during an initial soaking period in order to adjust the pH of the mixture to between 7.5 and 9. During this initial soaking period, the mixture is maintained at a pH between about 7.5 and 9 with stirring at a temperature between about 15 and 100° C., preferably between about 20 and 35° C. After the initial soaking period is complete, an additional amount of basic lithium salt is added to the mixture in order to increase the pH to a value greater than about 10, desirably between about 10 and 13, preferably between about 12 and 13. The suspension is stirred for the remainder of the soaking period at the higher pH value, that is, at a pH value greater than about 10, preferably at a pH value between about 12 and 13 at a temperature between about 15 and 100° C., preferably between about 20 and 35° C. Additional basic lithium salt can be added as needed in order to maintain the higher pH. A pH value between about 12 and 13 is substantially greater than the range of pH values for which colloidal manganese dioxide is stable (i.e., from about pH 8 to 10) thereby allowing the lithiated manganese dioxide intermediate product to settle out and form an agglomerated powder which can be separated more readily from the liquid phase. The total soaking time is desirably between about 4 and 24 hours, preferably between about 8 to 12 hours. The initial soaking time can desirably be less than 50% of the total soaking time, typically between about 10% and 50%, preferably between about 10 and 25% of the total soaking time.

The Applicants herein of the present patent application have determined that the multi-step lithiation process of the present invention wherein the manganese dioxide is soaked initially at a slightly basic pH followed by gradually increasing the pH and soaking at the desired higher pH allows substantially more lithium cations to ion-exchange with the hydrogen ions in the manganese dioxide lattice than methods of prior art in which pH was increased rapidly or instantly, for example, by addition of manganese dioxide powder to saturated (i.e., ≅5N) aqueous lithium hydroxide solution. When the pH is increased in a stepwise manner, more lithium cations can diffuse into the manganese dioxide lattice and exchange with hydrogen ions without creating stress in the crystal lattice than if the manganese dioxide were treated rapidly at very high pH (e.g., pH between about 11 and 13) without any soaking time between increases in pH.

The second stage of the lithiation process involves heat-treating the lithiated manganese dioxide intermediate product at a temperature between about 300 and 420° C. to remove residual water (e.g., lattice water from unexchanged hydrogen ions and from water occluded in closed or pores, etc.). During heat-treatment, additional lithium cations from lithium salt(s) deposited on the surface of the manganese dioxide particles can insert into the manganese dioxide lattice. Such lithium cation insertion can compensate for the decreased manganese oxidation state (reduction) resulting from oxidation of the lithium salt anion (e.g., $OH^-$, $CO_3^{-2}$, etc.) by manganese dioxide, as shown, for example, for lithium hydroxide in Equation 3.

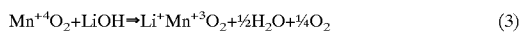

$$Mn^{+4}O_2 + LiOH \rightarrow Li^+Mn^{+3}O_2 + \tfrac{1}{2}H_2O + \tfrac{1}{4}O_2 \tag{3}$$

In addition, because of some oxygen loss by manganese dioxide at temperatures above about 350° C., lithiated manganese dioxide after heat-treatment can have a chemical composition of $Li_yMnO_{2-\delta}$, wherein $0.075 \leq y \leq 0.175$ and $0.01 \leq \delta \leq 0.06$.

The preferred lithiation process also can be employed advantageously using EMD having a sodium content greater than 2000 ppm. However, with such an EMD, it is desirable to pre-treat the EMD with acid as described by Capparella et al. in U.S. Pat. No. 5,698,176 in order to replace the sodium cations in the ion-exchangeable surface sites with hydrogen ions. The resulting acid-treated EMD can then be treated with a basic lithium salt, preferably lithium hydroxide, as described hereinabove.

In another embodiment, the liquid ion-exchange medium containing lithium cations for ion-exchange with surface and crystal lattice hydrogen ions of the manganese dioxide can be a low melting point lithium salt mixture. Preferably, the manganese dioxide can be EMD having a $\gamma$-$MnO_2$ crystal structure, a sodium content of less than about 2000 ppm, preferably less than about 500 ppm, and a lithium content of less than about 600 ppm. The preferred multi-step lithiation process includes the following steps:

(1) Manganese dioxide is intimately dry-blended with a suitable amount of solid, low melting point lithium salt mixture to form a reaction precursor mixture. Desirably, enough lithium salt mixture is added to the manganese dioxide whereby the mole ratio of Li/Mn in the reaction precursor mixture is between about 0.05 and 0.175. The lithium salt mixture desirably has a melting point less than about 350° C. and can be lithium nitrate.

(2) The reaction mixture is heated for a specified period of time, desirably between about 2 and 12 hours at a temperature above the melting point of the lithium salt mixture, but lower than about 350° C. and produce a lithiated manganese dioxide intermediate product having the nominal formula of $Li_xMnO_2$, wherein $0.05 \leq x \leq 0.175$ thereby.

(3) The intermediate reaction product is heat-treated in an oxidizing atmosphere, such as air or oxygen, to a temperature greater than about 350° C. but less than about 420° C. and held at that temperature for a period of time, desirably between about 4 and 12 hours, to remove any residual or occluded water. A heat-treated lithiated manganese dioxide product having the chemical composition $Li_yMnO_{2-\delta}$, wherein $0.05 \leq y \leq 0.175$ and $0.01 \leq \delta \leq 0.06$ is produced thereby.

(4) The heat-treated lithiated manganese dioxide can be advantageously inserted into a primary lithium cell for use as cathode active material therein.

Suitable low melting point lithium salts or lithium salt mixtures typically have melting points between about 220° C. and 320° C. and can be selected from the group consisting of: lithium nitrate (m.p. 261° C.); lithium perchlorate (m.p. 236° C.); lithium bis(trifluoromethylsulfonyl) imide (m.p. 228° C.); and lithium tetrafluoroborate (m.p. 310° C.). In addition to individual low melting point lithium salts, low melting point binary eutectic mixtures of lithium salts, such as $LiNO_3$:$LiCl$ in a weight ratio of 88:12 (m.p. 260° C.) or binary eutectic mixtures of lithium and potassium salts such as $LiNO_3$:$KNO_3$ in a weight ratio of 42:58 (m.p. 124° C.) or $LiClO_4$:$KClO_4$ in a weight ratio of 66:34 (m.p. 210° C.), are also suitable. However, because of the presence of residual chloride or potassium ions, for example, in the case of eutectic mixtures containing lithium chloride, potassium nitrate or lithium perchlorate, and both chloride and potassium ions in the case of mixtures containing potassium perchlorate, it is desirable to wash the lithiated manganese dioxide product with water after heat-treatment to remove these ions. Preferred low melting point salt mixtures include lithium nitrate and a eutectic mixture of lithium and potassium nitrates (i.e., $LiNO_3$:$KNO_3$; 42:58; m.p. 124° C.)

A sufficient amount of low melting point lithium salt mixture is required in order to provide a lithiated manganese dioxide having a total lithium content between 0.4 and 1.3% lithium by weight, preferably 0.6 and 1.2%.

In order to accomplish an ion-exchange of lithium cations for hydrogen ions by the method of this invention, the low melting point lithium salt mixture must be present as a liquid. As a liquid, it is theorized that the molten salt can flow into pores in and between EMD particles, wet surfaces of the EMD particles and form liquid-solid interfaces, thereby providing diffusion pathways for the ion-exchange process. However, if the heat-treatment temperature is substantially higher than the melting point of the lithium salt, various undesirable solid state reactions can occur producing substantial structural rearrangement of the $\gamma$-$MnO_2$ crystal lattice. Such undesirable structural rearrangements can form other manganese oxide phases or lithium manganese oxide phases other than the lithiated manganese dioxide of this invention. Formation of other lithium manganese oxide phases is undesirable because such phases typically exhibit inferior discharge performance and thus are unsuitable as active cathode materials for the primary lithium cell of this invention. Examples of undesirable lithium manganese oxide phases include $Li_2MnO_3$, $LiMn_2O_4$, and $LiMnO_2$. Examples of undesirable non-lithiated manganese oxide phases include $\beta$-$MnO_2$, $Mn_2O_3$, and $Mn_3O_4$.

In the case of lithium nitrate, the preferred heat-treatment schedule includes an initial heating at a temperature of about 300° C., a final heat-treatment at a temperature of from about 350 to 390° C., and a total hold time ranging from about 4 to 12 hours. The heat-treated lithiated manganese dioxide product resulting from treatment of EMD and lithium nitrate advantageously does not have to be further purified before it can be used as a cathode active material in a primary lithium cell.

In order to minimize reduction of $Mn^{+4}$ to $Mn^{+3}$, it is desirable to provide an oxidizing atmosphere during the entire heat-treatment schedule. Suitable oxidizing atmospheres include pure oxygen, air containing an increased partial pressure of oxygen, and air. During step (3) of the multi-step lithiation process described hereinabove, preferred atmospheres include pure oxygen and air having a decreased partial pressure of carbon dioxide. Such atmospheres minimize formation of $Li_2CO_3$ by the molten lithium salts. Formation of lithium carbonate during the lithiation process is highly undesirable. The presence of $Li_2CO_3$ on the surface of the EMD particles can inhibit the ion-exchange process. The use of an inert or reducing atmosphere such as argon or nitrogen during lithiation can cause reduction of $Mn^{+4}$ to $Mn^{+3}$ and produce a lithiated manganese dioxide with lower discharge capacity.

Figure 2:
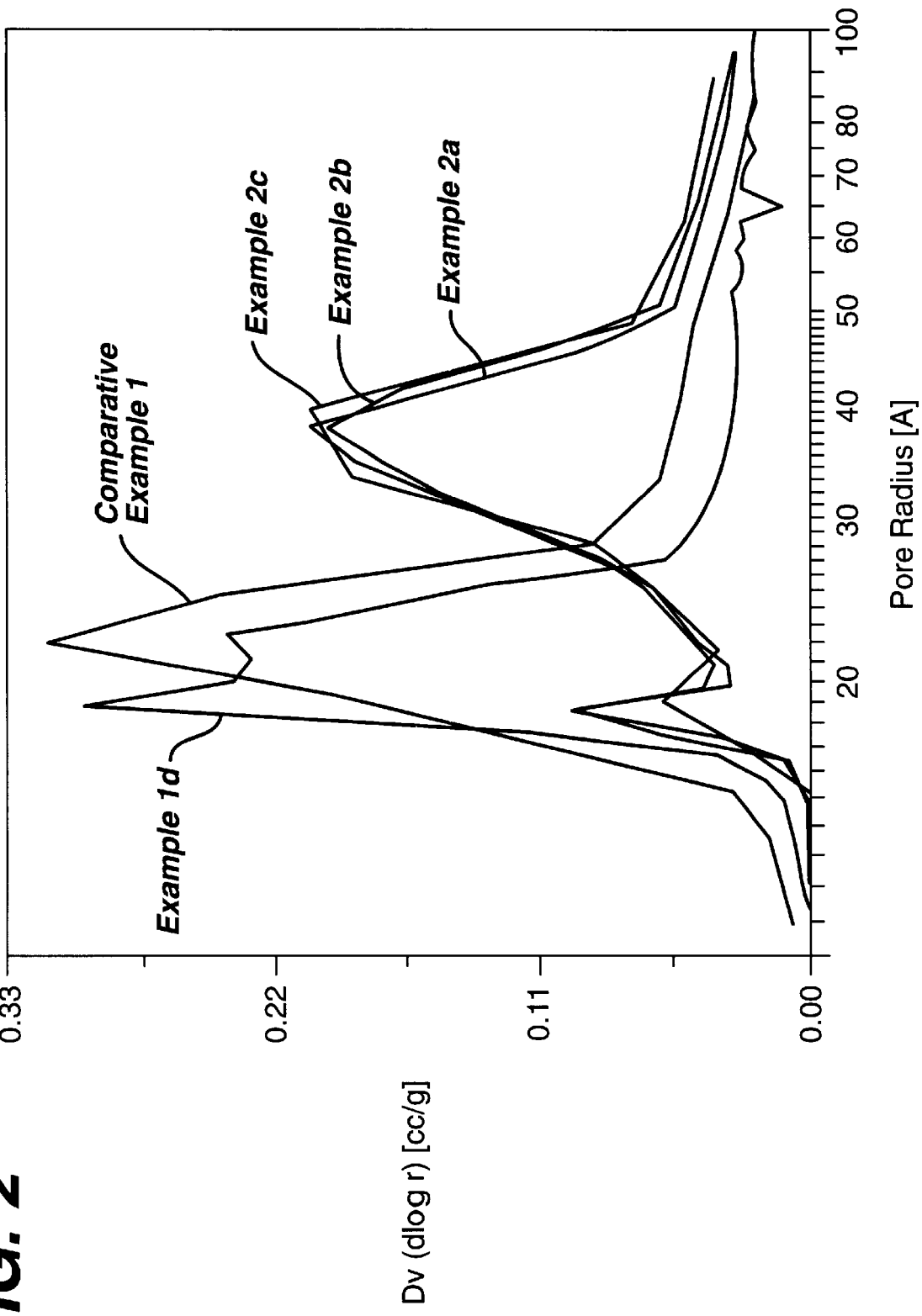
FIG. 2 is a graph depicting the incremental pore volume distributions for lithiated manganese dioxides having various lithium to manganese mole ratios and heat-treated commercial lithium grade EMD.

Lithiated manganese dioxide prepared by the method of the present invention also has been found by porosimetry to exhibit larger average pore diameters than the EMD starting material. It is theorized that small diameter pores present in the lithiated intermediate product can consolidate into much larger diameter pores during heat-treatment. The extent of this consolidation has been observed to be significantly greater for lithiated manganese dioxide that was lithiated by a molten lithium salt mixture than for that lithiated in an aqueous solution of a basic lithium salt as shown in FIG. 2. Furthermore, in the case of lithiated manganese dioxide prepared using a low melting point lithium salt mixture, the increase in average pore diameter is about twofold that observed for conventionally heat-treated EMD (FIG. 2). Such an increase in average pore diameter is expected to improve discharge performance of lithium primary cells containing the lithiated manganese dioxide, especially at high discharge rates or at low temperatures.

Lithiated manganese dioxide prepared by the method of this invention has the unique property that the $\gamma$-$MnO_2$ crystal structure of the starting EMD essentially is retained after the heat-treatment. That is, conversion of the ramsdellite-type $MnO_2$ in the $\gamma$-$MnO_2$ structure to $\beta$-$MnO_2$ is effectively inhibited (i.e., other than for trace amounts, typically less than about 1.0% by wt of ramsdellite-type $MnO_2$) during heat-treatment. In contrast, a significant portion of the ramsdellite-type $MnO_2$ in the $\gamma$-$MnO_2$ structure is converted to $\beta$-$MnO_2$ when EMD which has not been lithium ion-exchanged is heat-treated to remove lattice water. Further, heat-treated, lithiated manganese dioxide can be characterized structurally by x-ray diffraction analysis. The x-ray diffraction powder pattern (Cu $K_\alpha$) of the lithiated manganese dioxide prepared by the method of the present invention exhibits in addition to those peaks characteristic of $\gamma$-$MnO_2$, other broad diffraction peaks at a 2-Theta angle of about 31 degrees having a peak intensity of from about 35 to 40 percent that of the most intense peak and at a 2-Theta angle of about 24 degrees having a peak intensity of from about 35 to 40 percent, which can be attributed to a putative epsilon $(_e)$-$MnO_2$ phase.

In yet another embodiment, the present invention features inclusion of the lithiated manganese dioxide in the cathode of a primary lithium electrochemical cell.

Figure 9:
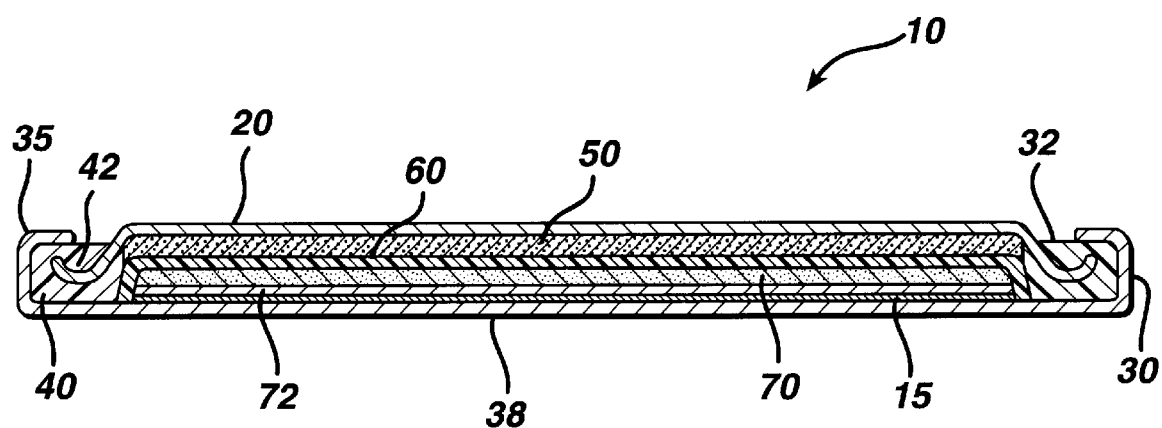
FIG. 9 is a cross sectional view of a typical primary lithium electrochemical coin cell.

A primary lithium electrochemical cell can be fabricated in the form of a button or coin cell 10 as shown in FIG. 9. In this embodiment, a disk-shaped cylindrical housing 30 is formed having an open end 32 and a closed end 38. Housing 30 is preferably formed from nickel-plated steel, for example. An electrical insulating member 40, preferably a cylindrical member having a hollow core, is inserted into housing 30 so that the outside surface of insulating member 40 abuts and lines the inside surface of housing 30. Alternatively, the inside surface of housing 30 may be coated with a polymeric material that solidifies into insulator 40 abutting the inside surface of housing 30. Insulator 40 can be formed from a variety of thermally stable insulating materials, for example, nylon or polypropylene. A cathode current collector 15 comprising a metallic grid can be inserted into the cell so that it abuts the inside surface of the closed end 38 of the housing 30. The cathode current collector 15 can be welded onto the inside bottom of the closed end 38 of the housing 30. An optional conductive layer 72 comprising a mixture of graphite and polytetrafluoroethylene (PTFE) binder is compressed into the cathode current collector 15. A layer of cathode material 70 comprising the lithiated manganese dioxide made by the process of the present invention as active cathode material is inserted overlying optional conductive layer 72. Alternatively, in the absence of the conductive layer 72, the layer of cathode material 70 is compressed into cathode current collector 15. A separator sheet 60 is placed overlying cathode layer 70. Nonaqueous electrolyte is added so that it fully penetrates through separator sheet 60 and cathode layer 70. A layer of anode material 50, typically lithium or lithium alloy is placed over separator sheet 60. The anode cover 20, formed preferably from nickel-plated steel, is inserted into open end 32 of housing 30 and peripheral edge 35 of housing 30 is crimped over the exposed insulator edge 42 of insulating member 40. The peripheral edge 35 bites into insulator edge 42 closing housing 30 and tightly sealing the cell contents therein. The anode cover 20 also functions as the negative terminal of the cell and housing 30 at the closed end 38 functions as the positive terminal of the cell. Alternatively, a primary lithium cylindrical cell can be fabricated comprising a spirally wound anode and cathode with a separator sheet positioned therebetween. This electrode configuration for primary lithium cells is well known in the art and an embodiment thereof is described in detail, for example, in U.S. Pat. No. 4,707,421. Compositions for the electrodes, separator, and electrolyte as disclosed in U.S. Pat. No. 4,707,421, herein incorporated by reference, can be used for the primary lithium cells of the present invention except that the manganese dioxide comprising the cathode can be substituted with the lithiated manganese dioxide prepared by the process of this invention.

The cathode for a primary lithium cell consists of a cathode active material mixed with suitable polymeric binders, for example, polytetrafluoroethylene, and conductive agents, for example, carbon black and graphite, to produce a paste or slurry which can be applied to a current collector comprising a highly porous sintered, felted, or foamed electrically-conductive substrate, for example, a stainless steel grid, an expanded metal foam or a metal foil. The cathode active material can comprise the lithiated manganese dioxide of the invention alone or in a physical admixture with conventional heat-treated manganese dioxide (e.g., HEMD). Cathode pieces of the appropriate size can be cut from the coated substrate.

The anode active material preferably comprises lithium or a lithium alloy. An alloying metal, such as aluminum, is present at a low concentration, typically less than 1 wt. %.

A separator layer is located between the two electrodes. The separator layer typically consists of a porous polymer film or thin sheet that serves as a spacer and prevents electrical contact between the cathode and anode while allowing electrolyte to move freely through the pores. Suitable separators can include relatively non-reactive polymers such as, for example, polypropylene, polyethylene, a polyamide (i.e., a nylon), a polysulfone, or polyvinyl chloride (PVC). The separator has a preferred thickness between about 10 microns and 200 microns and a more preferred thickness between about 20 microns and 50 microns.

The electrodes and separator are contained within a case or can. As described hereinabove, the case can take the form of a coin cell, button cell, cylindrical cell, prismatic cell, laminar cell or other standard cell geometry. The case is closed to provide a gas-tight and fluid-tight seal. The case can be made of a metal such as nickel, nickel clad or plated steel, stainless steel, aluminum or a plastic material such as PVC, polypropylene, a polysulfone, an acrylic acid-butadiene-styrene terpolymer (ABS), or a polyamide. The case containing the electrodes and separator can be filled with a suitable liquid or a polymeric nonaqueous electrolyte.

The nonaqueous electrolyte can be any nonaqueous electrolyte or combination of nonaqueus electrolytes known in the art. Typically, nonaqueous electrolytes suitable for use in a primary lithium/$MnO_2$ cell comprise a lithium salt dissolved in an organic solvent or combination of organic solvents. Typically, the salt is lithium perchlorate ($LiClO_4$) or lithium trifluoromethylsulfonate ($LiCF_3SO_3$). Other suitable electrolyte salts include: LiPF6, $LiAsF_6$, $LiBF_4$, lithium bis(trifluoromethylsulfonyl) imide ($Li(CF_3SO_2)_2N$), and lithium bis(perfluoroethylsulfonyl) imide (Li(CF$_3$CF$_2$SO$_2$)$_2$N). Suitable organic solvents include ethylene carbonate (EC), propylene carbonate(PC), butylene carbonate, and the like; dimethylcarbonate (DMC); dimethoxyethane (DME); dioxolane; gamma($\gamma$)-butyrolactone; diglyme; and mixtures thereof. A preferred electrolyte composition consists of a 0.6 M solution of lithium trifluoromethylsulfonate (CF$_3$SO$_3$Li; available under the tradename, FC-122, from 3M) in a mixture of dry ethylene carbonate, propylene carbonate, and dimethoxyethane. Once filled with the nonaqueous electrolyte, the case is sealed to confine the nonaqueous electrolyte and to inhibit the infiltration of moisture and air into the cell.

When lithiated manganese dioxide having a nominal composition of Li$_y$MnO$_{2-\delta}$ wherein $0.075 \leq y \leq 0.15$ and $0.01 \leq \delta \leq 0.06$ and a predominantly $\gamma$-MnO$_2$-type crystal structure made according to the method of this invention is used as the cathode active material in a primary lithium cell, a significant performance advantage is obtained. In particular, the lithiated manganese dioxide provides significant increases in both initial and average operating voltages compared to non-lithiated manganese dioxide or lithiated manganese dioxide of prior art. The higher operating voltages can be attributed at least in part to stabilization of the ramsdellite-type MnO$_2$ portion of the $\gamma$-MnO$_2$ crystal lattice by the presence of lithium cations. It is theorized by the Applicants that because the ramsdellite-type MnO$_2$ crystal structure contains larger tunnels (1×2) than $\beta$-MnO$_2$ (1×1), stabilization of the structure having the larger tunnels facilitates subsequent lithium cation insertion into the crystal lattice during cell discharge. The lithiated manganese dioxide has an added benefit in that total discharge capacity can be greater, particularly at high rates of discharge, at low temperature or at both high rate of discharge and low temperature, than heat-treated un-lithiated manganese dioxide or lithiated manganese dioxide of prior art.

The following examples illustrate the invention.

EXAMPLE 1

The lithiated manganese dioxide was prepared in the following manner: Commercial "lithium grade" EMD (e.g., from Delta E.M.D. (Pty) Ltd. or Kerr-McGee Chemical Co.) containing less than 500 ppm Na and less than 600 ppm Li, having a pH of about 5, and also having an average particle size of about 30–50 $\mu$m was added slowly and with rapid stirring to a suitable amount of deionized or distilled water to form a suspension or slurry. The suspension was stirred rapidly for at least 15 minutes before solid lithium hydroxide powder was added incrementally in order to increase the pH. The pH of the suspension was increased from an initial value of about 4.5 to 5.0 in a first step by adding small portions of solid lithium hydroxide until 7.5<pH<9 was obtained. The suspension was soaked with stirring at room temperature at the initial pH for about 30 minutes. Additional lithium hydroxide powder was added in small portions in a second step until the desired final pH value (as given hereinbelow) was obtained. The suspension was soaked with stirring for an additional 12 hours to allow lithium/proton ion-exchange to take place. The pH was observed to decrease slightly during the ion-exchange process. Additional solid lithium hydroxide was added to compensate for this decrease and the suspension soaked for an additional hour to stabilize the pH. Stirring was discontinued and the lithium ion-exchanged manganese dioxide allowed to settle for 4 to 8 hours, as needed. The solid product was collected by suction filtration after most of the clear supernatant liquid had been removed by pipetting.

Specifically, suitable amounts of solid lithium hydroxide were added in portions with soaking to each of three stirred suspensions of lithium grade EMD, all initially adjusted to 7.5<pH<9 as described hereinabove, to obtain final suspension pH values of about 9, 11, and >12. For example, a total of approximately 27 g (1.1 moles) of solid lithium hydroxide was added to a suspension of 2 kg (23.0 moles) of lithium grade EMD in 2 liters of deionized water to obtain a final pH of about 9, whereas about 100 g (4.2 moles) of lithium hydroxide was required to obtain a final pH>12 (viz., the maximum value for pH of 12.7 is obtained for a saturated lithium hydroxide solution). Another suspension of lithium grade EMD, having an initially adjusted pH of about 7.5 also was soaked with stirring for 12 hours. The solid lithium ion-exchanged manganese dioxide intermediate products were recovered by suction filtration and dried for 8 hours in a vacuum oven at about 150° C. The dried solids recovered from suspensions having final pH values of about 7, 9, 11, and >12 were heat-treated in air at about 380° C. for 8 hours to obtain the lithiated manganese dioxides of Examples 1a, 1b, 1c, and 1d, respectively.

Analysis of x-ray powder diffraction patterns (Cu K$_\alpha$ radiation) for the heat-treated lithiated manganese dioxides of Examples 1c and 1d, in particular, revealed phase compositions different from those of Examples 1a and 1b. For example, lithiated manganese dioxide of Example 1d appears to contain predominantly $\gamma$-MnO$_2$ phase, a trace amount of $\beta$-MnO$_2$ phase, and another phase, possibly $\epsilon$-MnO$_2$, based on the x-ray powder diffraction pattern shown in FIG. 1. The $\epsilon$-MnO$_2$ phase exhibits characteristic x-ray diffraction peaks at 2-Theta angles of 24 and 31 degrees. Further, the positions of the diffraction peaks located at these two 2-Theta angles as a function of pH of the suspension during the ion-exchange process and the relative intensity corresponding to each of these two peaks is given in Table 1. The diffraction peak located at a 2-Theta angle of nominally 25 degrees in EMD appeared to shift to lower 2-Theta angles as the suspension pH increased. The diffraction peak at a 2-Theta angle of nominally 29 degrees in EMD shifted to higher 2-Theta angles as pH of the suspension was increased. The relative intensities of both diffraction peaks increased as pH of the suspension increased from 7 to >12.

TABLE 1

| Sample | pH EMD slurry | $2_\theta$ 25° XRD Peak Position (intensity) | $2_\theta$ 29° XRD Peak Position (intensity) |
|---|---|---|---|
| Ex. 1a | 7.5 | 25.04° (35.1%) | 29.55° (35.1%) |
| Ex. 1b | 9 | 24.49° (35.7%) | 30.29° (34.8%) |
| Ex. 1c | 11 | 24.86° (39.6%) | 31.03° (35.9%) |
| Ex. 1d | >12 | 24.12° (39.8%) | 31.76° (37.2%) |

As the pH of the EMD suspension was increased by addition of lithium hydroxide, a corresponding increase in total lithium content of the lithiated manganese dioxide product was observed as shown in Table 2. Total lithium content was determined by inductively coupled plasma atomic emission spectroscopy (ICP/AES). For example, ion-exchange at a suspension pH of 9 gave a lithiated manganese dioxide having a lithium content of about 0.5 weight percent, whereas treatment at a suspension pH>12 gave a lithiated manganese dioxide having a lithium content of >1.2 weight percent.

The specific surface areas of the lithiated manganese dioxides prepared at the different suspension pH values were determined after heat-treatment from nitrogen adsorption isotherms determined by the BET method and are given in Table 2. Both specific surface area and average pore volume decrease for Li ion-exchanged manganese dioxides at suspension pH values >7.5.

TABLE 2

| Sample | Final slurry pH | Total % Li (w/w) | % Mn (w/w) | x in $MnO_x$ | Surface Area ($m^2/g$) |
|---|---|---|---|---|---|
| Comp. Ex. 1 | 5.5 | 0.18 | 61.6 | 1.97 | 28.70 |
| Ex. 1a | 7.5 | 0.28 | 61.3 | 1.97 | 28.90 |
| Ex. 1b | 9 | 0.51 | 61.0 | 1.97 | 26.85 |
| Ex. 1c | 11 | 0.75 | 61.1 | 1.97 | 26.05 |
| Ex. 1d | >12 | 1.24 | 60.6 | 1.95 | 25.40 |

Solid state $^7Li$ MAS (viz., "Magic Angle Spinning") NMR measurements were performed on both non-heat-treated and heat-treated samples of the lithiated manganese dioxides of Example 1d and Comparative Example 1 to identify differences in the local chemical environments of the inserted lithium cations (Table 3). Room temperature $^7Li$ MAS NMR spectra were collected on a CMX-200 NMR spectrometer at 77.83 MHz using a single-pulse sequence technique at sample spinning speeds of 9–10 kHz by the general procedure reported by Lee et al. (*J. Amer. Chem. Soc.*, Vol. 120, 1998, pp. 12601–3) for studying lithium manganate cathode materials. The obtained NMR spectra are referenced to a 1M LiCl solution at 0 ppm. All of the samples exhibited resonances at low chemical shift values that can be assigned to $Li^+$ in a diamagnetic local environment, for example, lithium salt on the surface of the EMD particles. A broad resonance having a chemical shift of about 100 ppm observed for both heat-treated and non-heat-treated samples of Comparative Example 1 can be attributed to $Li^+$ in a local environment containing $Mn^{+3}$ cations (i.e., $Mn^{+3}$ (1)). Similarly, both the heat-treated and non-heat-treated samples of Example 1d exhibited a broad resonance having a chemical shift of about 300 ppm which can be assigned to $Li^+$ in a local environment containing a mixture of $Mn^{+3}$ and $Mn^{+4}$ cations. Of particular significance is the appearance of resonances at 75 ppm and 80 ppm for heat-treated samples of both Comparative Example 1 and Example 1d, respectively. Such resonances can be attributed to $Li^+$ in a local environment containing $Mn^{+3}$ (i.e., $Mn^{+3}$ (2)) that is different from that producing the broad resonance at 100 ppm. Particularly for the case of heat-treated Example 1d, the appearance of a resonance at 80 ppm is consistent with a reductive insertion of $L^+$ cations from surface lithium salts into sites in the $\gamma$-$MnO_2$ lattice different from those of $Li^+$ cations inserted by ion-exchange before the heat-treatment.

TABLE 3

| Sample | Diamagnetic | $Mn^{+3}$ (1) | $Mn^{+3}$ (2) | $Mn^{+3}/Mn^{+4}$ |
|---|---|---|---|---|
| Comp. Ex. 1 no heat-treat | −1 ppm | 100 ppm (broad) | | |
| Comp. Ex. 1 heat-treated | 12.8 ppm | 100 ppm (broad) | 75 ppm | |
| Example 1d no heat-treat | −0.8 ppm | | | 300 ppm (broad) |
| Example 1d heat-treated | −0.5 ppm | | 80 ppm | 300 ppm (broad) |

EXAMPLE 2

Three 100.0 g (1.15 mole) portions of commercial lithium grade EMD powder containing less than 500 ppm Na and less than 600 ppm Li, having a pH of about 5, and an average particle size of about 40–50 µm were thoroughly dry blended with 11.9 g (0.17 mole), 7.9 g (0.12 mole), and 5.9 g (0.086 mole) portions of reagent grade lithium nitrate (e.g., Fisher Scientific) to prepare reaction mixtures having Li/Mn mole ratios of 0.15, 0.10, and 0.075, respectively. Heat-treatment of these reaction mixtures in an alumina tray in air was performed in two steps, initially at 300° C. for 4 hours, then at 350° C. for 4 hours to produce the lithiated manganese dioxides of Examples 2a, 2b, and 2c. Total %Li and %Mn, oxygen stoichiometry (as x in $MnO_x$), residual water contents, and specific surface areas of the lithiated manganese dioxides of Examples 2a, 2b, and 2c are given in Table 4. The x-ray powder diffraction patterns for Examples 2a, 2b, and 2c all exhibited major peaks characteristic of $\gamma$-$MnO_2$ and $\epsilon$-$MnO_2$, a minor peak characteristic of $\beta$-$MnO_2$, and for Example 2a, an additional weak peak attributable to $Li_2O$ as a minor phase.

COMPARATIVE EXAMPLE 1

A sample of commercial lithium grade EMD powder containing less 500 ppm Na and less than 600 ppm Li, a pH of about 5, and an average particle size of about 40–50 µm was placed in an alumina tray, heated in air at 350° C. for 8 hours, and allowed to furnace cool to room temperature. Total %Li and %Mn, oxygen stoichiometry (as x in $MnO_x$), residual water content, and specific surface area are given in Table 4. The x-ray powder diffraction pattern exhibited major peaks characteristic of both $\gamma$-$MnO_2$ and $\beta$-$MnO_2$.

COMPARATIVE EXAMPLE 2

A 100.0 g (1.15 mole) portion of commercial lithium grade EMD powder containing less than 500 ppm Na and less than 600 ppm Li, having a pH of about 5, and an average particle size of about 40–50 µm was dry blended with 7.24 g (0.17 mole) of reagent grade lithium hydroxide monohydrate (Alfa/Aesar). The resulting mixture having a Li/Mn mole ratio of 0.15 was placed in an alumina tray, heated in air at 380° C. for 12 hours, and allowed to furnace cool to room temperature. Total %Li and %Mn, oxygen stoichiometry (as x in $MnO_x$), residual water content, and specific surface area are given in Table 4. The x-ray powder diffraction pattern exhibited major peaks characteristic of $\gamma$-$MnO_2$ and $\beta$-$MnO_2$, as well as minor peaks characteristic of $Li_2O$.

COMPARATIVE EXAMPLE 3

Lithiated EMD was prepared by stirring commercial EMD powder in an aqueous lithium hydroxide solution as disclosed in unexamined Japanese Patent Application (Kokai) JP62-160657. A 40.0 g (0.46 mole) portion of commercial EMD powder was immersed in 300 ml of a 2M LiOH aqueous solution, stirred at room temperature for 100 hours, collected by suction filtration, washed with about 1 L of deionized water, air dried, and heat-treated at 380° C. in air for 8 hours. Total %Li and %Mn, oxygen stoichiometry (as x in $MnO_x$), residual water content, and specific surface area are given in Table 4. The x-ray powder diffraction pattern exhibited major peaks characteristic of $\gamma$-$MnO_2$ and $\beta$-$MnO_2$.

COMPARATIVE EXAMPLE 4

Lithiated EMD was prepared by stirring commercial EMD powder in a saturated aqueous lithium hydroxide solution as disclosed in Japanese Patent Application JP52-073328. A 25.0 g (0.29 mole) portion of commercial EMD powder was immersed in 5M LiOH aqueous solution (viz., approximately saturated), stirred at room temperature for 24 hours, collected by suction filtration, dried, and heat-treated at 380° C. in air for 8 hours. Total %Li and %Mn, oxygen stoichiometry (as x in $MnO_x$), residual water content, and specific surface area are given in Table 4.

COMPARATIVE EXAMPLE 5

A 100.0 g (1.15 mole) portion of commercial lithium grade EMD powder containing less than 500 ppm Na and less than 600 ppm Li, having a pH of about 5, and an average particle size of about 40–50 $\mu$m was thoroughly dry blended with 11.9 g (0.17 mole) of reagent grade lithium nitrate (Fisher Scientific). The resulting mixture (mole ratio Li/Mn=0.15) was heated in an alumina tray at 380° C. in air for 12 hours or at 300° C. for 8 hours to produce the lithiated manganese dioxides of Examples 5a and 5b, respectively. Total %Li and %Mn (w/w), oxygen stoichiometry (as x in $MnO_x$), residual water contents, and specific surface areas for the lithiated manganese dioxides of Examples 5a and 5b are given in Table 4. The x-ray powder diffraction pattern of the lithiated manganese dioxide of Example 5a exhibited major peaks characteristic of $\gamma$-$MnO_2$, $Mn_2O_3$, and $\beta$-$MnO_2$, as well as some minor peaks attributed to unidentified phases. The x-ray powder diffraction pattern of the lithiated manganese dioxide of Example 5b exhibited major peaks characteristic of $\gamma$-$MnO_2$ and $\epsilon$-$MnO_2$ phases and some minor peaks characteristic of $\beta$-$MnO_2$.

TABLE 4

| Sample | Li/Mn mole ratio | Total % Li (w/w) | Total % Mn (w/w) | x in $MnO_x$ | Residual $H_2O$ (wt %) | SSA ($m^2/g$) |
| --- | --- | --- | --- | --- | --- | --- |
| Ex. 2a | 0.15 | 1.24 | 60.1 | 1.92 | 0.50 | — |
| Ex. 2b | 0.10 | 0.83 | 60.7 | 1.94 | 1.28 | 31.0 |
| Ex. 2c | 0.075 | 0.60 | 61.6 | 1.95 | 1.10 | 26.2 |
| Comp. Ex. 1 | <0.005 | 0.038 | 60.7 | 1.97 | 0.41 | 33.8 |
| Comp. Ex. 2 | 0.15 | 1.30 | 60.35 | 1.92 | 0.38 | 16.5 |
| Comp. Ex. 3 | 0.15 | 1.24 | 58.7 | 1.95 | 0.86 | 16.6 |
| Comp. Ex. 4 | 0.25 | 1.89 | 60.7 | 1.91 | — | — |
| Comp. Ex. 5a | 0.15 | 1.30 | 60.25 | 1.92 | 0.38 | 16.5 |
| Comp. Ex. 5b | 0.15 | 1.24 | 60.1 | 1.95 | 0.86 | — |

Porosimetric analysis of lithiated manganese dioxide powders using multipoint nitrogen adsorption at 77K (Sample outgassing conditions: 150° C./2 hrs, $10^{-4}$ mtorr) provided high resolution nitrogen adsorption isotherm data from which pore volume and pore size distributions could be calculated. A comparison of porograms showing the incremental pore volume distributions for the lithiated manganese dioxide powders of Examples 1d and 2a–c, and the heat-treated lithium grade EMD of Comparative Example 1 are given in FIG. 2. The lithiated manganese dioxide powders of this invention typically exhibited average pore diameters ranging from about 70 to 85 Å, which is substantially larger than that of the heat-treated lithium grade EMD of Comparative Example 1 (viz., 40 to 50 Å) or the heat-treated lithiated EMD of Example 1d (viz., 35 to 50 Å). Furthermore, the average pore diameter appears to be independent of Li/Mn mole ratio for the lithiated manganese dioxide powders of Examples 2a–c prepared in the presence of molten $LiNO_3$.

The observed increase in average pore diameter for heat-treated EMD relative to "as-received" EMD can be attributed generally to consolidation of smaller pores into larger pores during heat-treatment. The introduction of lithium ions into the ramsdellite-type lattice sites in the $\gamma$-$MnO_2$ structure by ion-exchange is theorized by the Applicants of the present invention to stabilize the ramsdellite-type $MnO_2$ phase thereby inhibiting the phase conversion of $\gamma$-$MnO_2$ to $\gamma/\beta$-$MnO_2$. This inhibition of $\beta$-$MnO_2$ phase formation can be expected to retard pore consolidation as well. Incomplete pore consolidation is evident in the porogram shown in FIG. 2 as a bimodal distribution for the lithiated manganese oxide of Example 1d. Although introduction of lithium ions into ramsdellite-type lattice sites of $\gamma$-$MnO_2$ can inhibit $\beta$-$MnO_2$ formation, the presence of a low-melting lithium salt during heat-treatment still can promote pore consolidation as shown in FIG. 2 for the lithiated manganese dioxides of Examples 2a–c prepared in the presence of molten $LiNO_3$.

EXAMPLE 3

Flooded three-electrode glass electrochemical cells were used to evaluate the electrochemical performance of the lithiated manganese dioxides. A flooded electrochemical cell is a cell containing excess electrolyte such that current is not limited by electrolyte access to the electrode. A three-electrode flooded cell of the type used for the present evaluation is described by N. Iltchev et al. in *J. Power Sources*, 35, 1991, pp.175–181, and is included herein by reference. Such a three electrode cell comprises a test cathode as well as counter and reference electrodes. The test cathode typically contains 100 mg of a mixture of active cathode material and teflonized acetylene black (containing 35% PTFE by wt) in a 60/40 weight ratio pressed onto a nickel screen serving as the current collector. The counter and reference electrodes were both lithium metal foil. Even at low temperatures (e.g., –10° C.), flooded cells with test cathodes containing lithiated manganese dioxides of Examples 1a–d exhibited increased average operating voltages when discharged at a C/10 rate (i.e., at a current rate in which the total cell capacity is discharged during a period of 10 hours).

Figure 3:
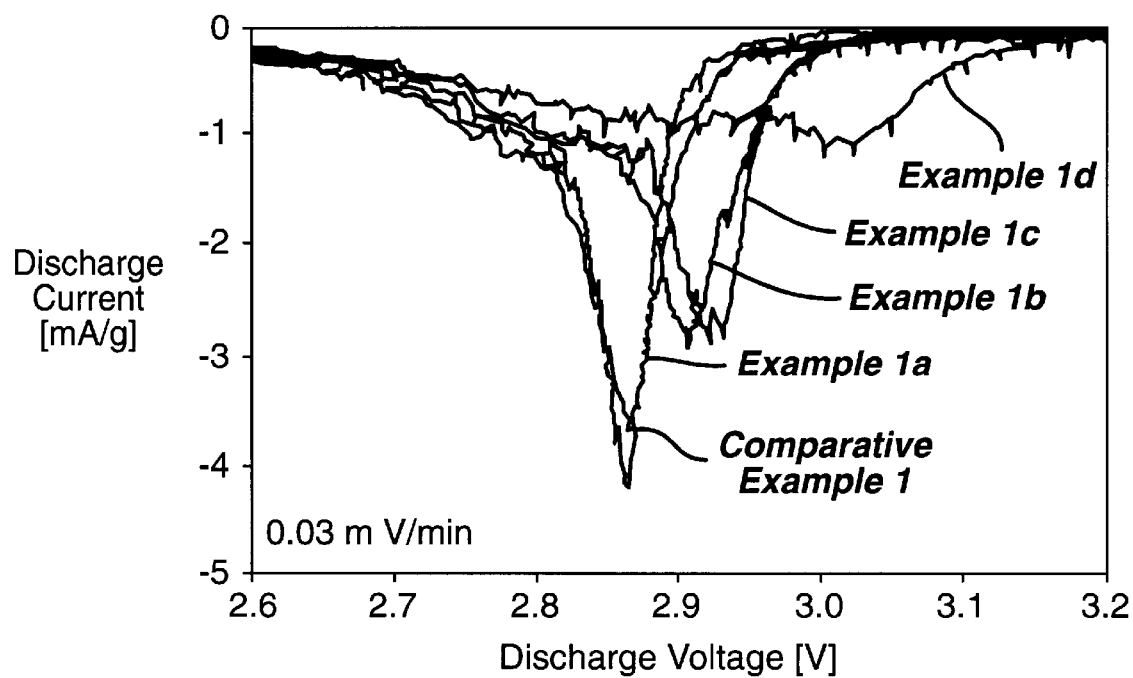
FIG. 3 is a graph depicting discharge current as a function of voltage for a potentiostatic reduction voltage sweep for cathodes containing lithiated manganese dioxides prepared from suspensions having a range of pH values.

Voltammetry was used for the characterization of the electrochemical properties of cathodes containing lithiated manganese dioxides of Examples 1a–d in flooded three-electrode glass cells at slow voltage scan rates (e.g., about 0.03 mV/min). The value of the discharge voltage exhibiting the maximum discharge current increased as the slurry pH increased (viz., lithium content) as shown in FIG. 3. This increase in voltage is most pronounced when the slurry pH was $\geq$11 (e.g., Examples 1c, 1d). Without being bound to any theory, this increase in voltage can be attributed to the formation of less $\beta$-$MnO_2$ phase that has lower electrochemical activity during heat-treatment for the lithiated manganese dioxides having higher lithium contents.

TABLE 5

| Sample | pH of slurry | Total % Li (w/w) | Discharge Capacity: CV (mAh/g) | Ave Operating Voltage (@ C/10) |
| --- | --- | --- | --- | --- |
| Comp. Ex. 1 | 5.5 | 0.18 | 249 | 2.811 |
| Ex. 1a | 7.5 | 0.28 | 237 | 2.816 |
| Ex. 1b | 9 | 0.51 | 235 | 2.844 |
| Ex. 1c | 11 | 0.75 | 240 | 2.860 |
| Ex. 1d | 12.7 | 1.24 | 211 | 2.954 |

EXAMPLE 4

Electrochemical cell discharge performance for the lithiated manganese dioxides of Examples 1 and 2 and the heat-treated materials of Comparative Examples 1–5 as cathodes was evaluated in Type CR2430 cold-rolled stainless steel coin cells, (e.g., Fuji Electrochemical Co., Ltd.). Maximum overall dimensions are specified by NEDA/ANSI (5011LC type) as 24.50 mm in diameter and 3.00 mm in height. Nominal internal volume is about 1.41 cm$^3$. This cell is of the type described hereinabove and shown schematically in FIG. 9. The positive electrode was prepared by pressing about 600 mg of a mixture containing 75% by weight graphite (e.g., available from Lonza G&T Ltd. under the trade designation "KS-6") and 25% by weight polytetrafluoroethylene (e.g., available from Dupont under the trade designation "T-60" PTFE dispersion) into a disk to form a conductive layer in the bottom of the cell housing, followed by pressing a cathode mixture containing 100 mg of the lithiated manganese dioxide and consisting of 60% by weight lithiated manganese dioxide, 35% by weight graphite, and 5% by weight PTFE into a disk on top of the conductive layer. A circular cut piece of microporous, nonwoven polypropylene separator, about 0.025 mm thick (e.g., available from Hoechst under the tradename "Celgard 2400") was placed on top of the cathode layer. An anode consisting of about 1 mm thick "battery-grade" lithium metal foil (e.g., available from Cypress-Foote Industries) that had been cleaned mechanically by abrasion was placed on top of the separator. Electrolyte solution containing 0.57 M lithium trifluoromethanesulfonate (e.g., available from 3M under the trade designation "FC-122") dissolved in a mixture of dry DME/EC/PC in a volume ratio of 70/10/20 percent was added to the cell. Finally, the nickel plated steel cover was put in place and the cell sealed by mechanical crimping.

The coin cells were discharged typically at a C/10 rate. As shown in Table 5, coin cells having cathodes containing the lithiated manganese dioxides of Examples 1b–d, in particular, cells containing the lithiated manganese dioxides of Examples 1c and 1d, exhibited higher average operating voltages compared with those of cells containing the heat-treated lithium grade EMD of Comparative Example 1. Significantly, the average operating voltage of a primary lithium cell can be increased by almost 150 mV when the lithiated manganese dioxide of the present invention is substituted for a conventionally heat-treated EMD. Furthermore, when coin cells containing the lithiated manganese dioxide of Examples 1c and 1d were discharged at a higher rate of C/2, the initial and average cell operating voltages for both Examples 1c and 1d remained higher than those for cells containing the heat-treated lithium grade EMD of Comparative Example 1.

Figure 4:
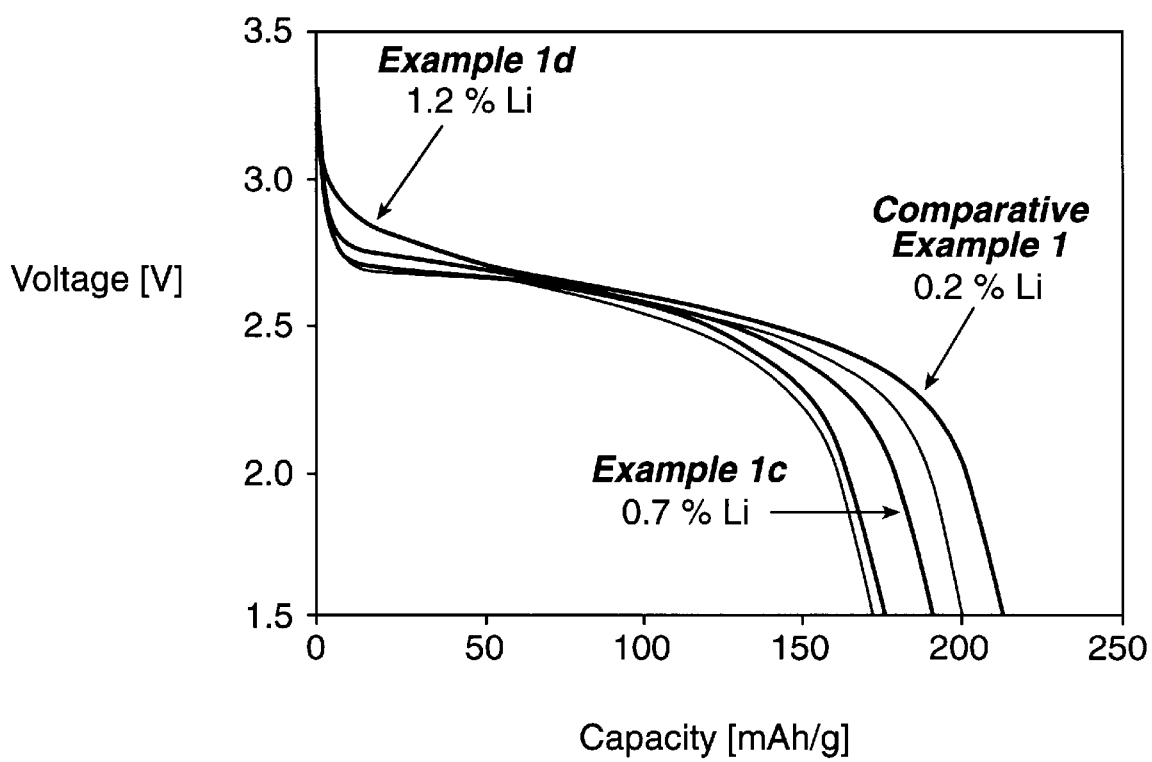
FIG. 4 is a graph depicting the discharge performance for coin cells having cathodes containing lithiated manganese dioxides having various lithium contents discharged at a C/2 rate.

Although coin cells containing the lithiated EMD of Comparative Example 4 gave a somewhat higher initial cell operating voltage when discharged at a C/10 rate, the average cell operating voltage and the total discharge capacity (i.e., to a 1.5V cutoff) were much lower than those for a cell containing the lithiated manganese dioxide of Example 1d. Further, the lithiated EMD of Comparative Example 3 gave lower initial operating voltages with both average operating voltage and total discharge capacity comparable to those for cells containing the lithiated manganese dioxide of Example 1d. Cells containing the lithiated EMD of Comparative Example 2 gave initial and average cell operating voltages that were substantially lower than those for cells containing the lithiated manganese dioxide of Example 1d as shown in FIG. 4.

Figure 5:
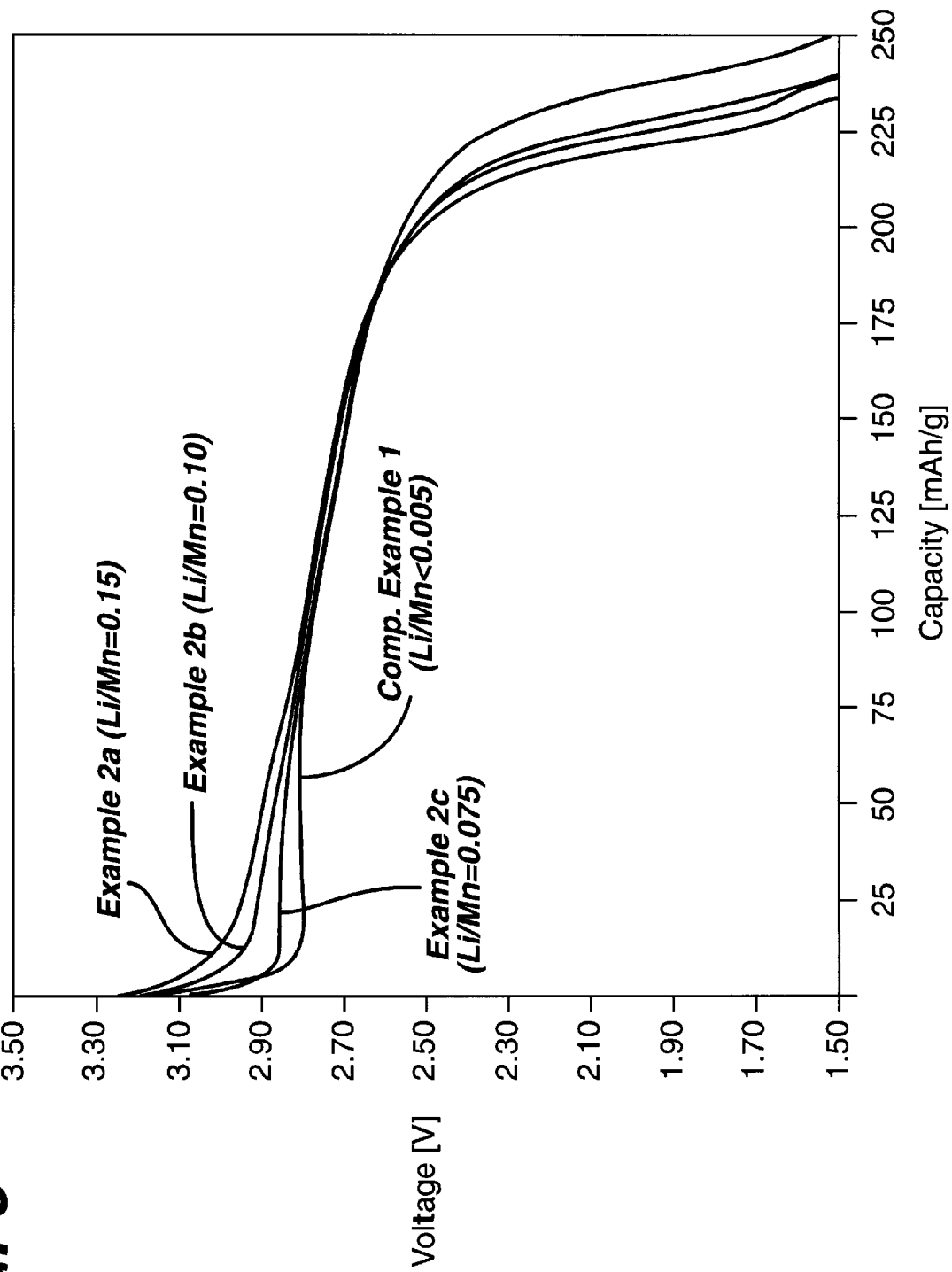
FIG. 5 is a graph depicting the discharge performance for coin cells having cathodes containing lithiated manganese dioxides having different lithium to manganese mole ratios discharged at a C/10 rate.

The effect of Li/Mn mole ratio on room temperature, low rate (i.e., C/10) discharge performance of coin cells containing lithiated manganese dioxides of Examples 2a–c is clearly demonstrated by the cell discharge curves shown in FIG. 5. As the lithium content was increased from about 0.6 wt % Li to about 1.2 wt. % Li for the lithiated manganese dioxides of Examples 2a–c, respectively, the initial cell operating voltages increased substantially above that for cells containing the conventionally heat-treated lithium grade EMD of Comparative Example 1. However, the increases in initial and average operating voltages also were accompanied by somewhat (<10%) decreased total discharge capacities (expressed in units of milliampere hours per gram of active cathode material, mAh/g) as shown in FIG. 5.

The average operating voltage of cells containing lithiated manganese dioxide prepared using a molten lithium salt also can be influenced strongly by the heat-treatment conditions. Both initial and average operating voltages of cells containing the lithiated manganese dioxide of Comparative Example 5b that had been heat-treated for 8 hours at 300° C. were greater than that for cells containing the lithiated manganese dioxide of Comparative Example 5a that had been heat-treated at 380° C. for 12 hours. The total discharge capacity for cells containing the lithiated manganese dioxide of Comparative Example 5b also was greater than that for cells containing the lithiated manganese dioxide of Comparative Example 5a. However, the residual water content of the lithiated manganese dioxide of Comparative Example 5b was substantially greater than that for either Comparative Examples 5a or 1 as shown in Table 4. Furthermore, the initial and average operating cell voltages for the lithiated manganese dioxide of Example 2a that had been heat-treated in two steps, initially at 300° C. for 4 hours, then at 350° C. for 4 hours were intermediate between those for Comparative Examples 5a and 5b. The residual water content of Example 2a was low as in Comparative Examples 1 and 5a.

Figure 6:
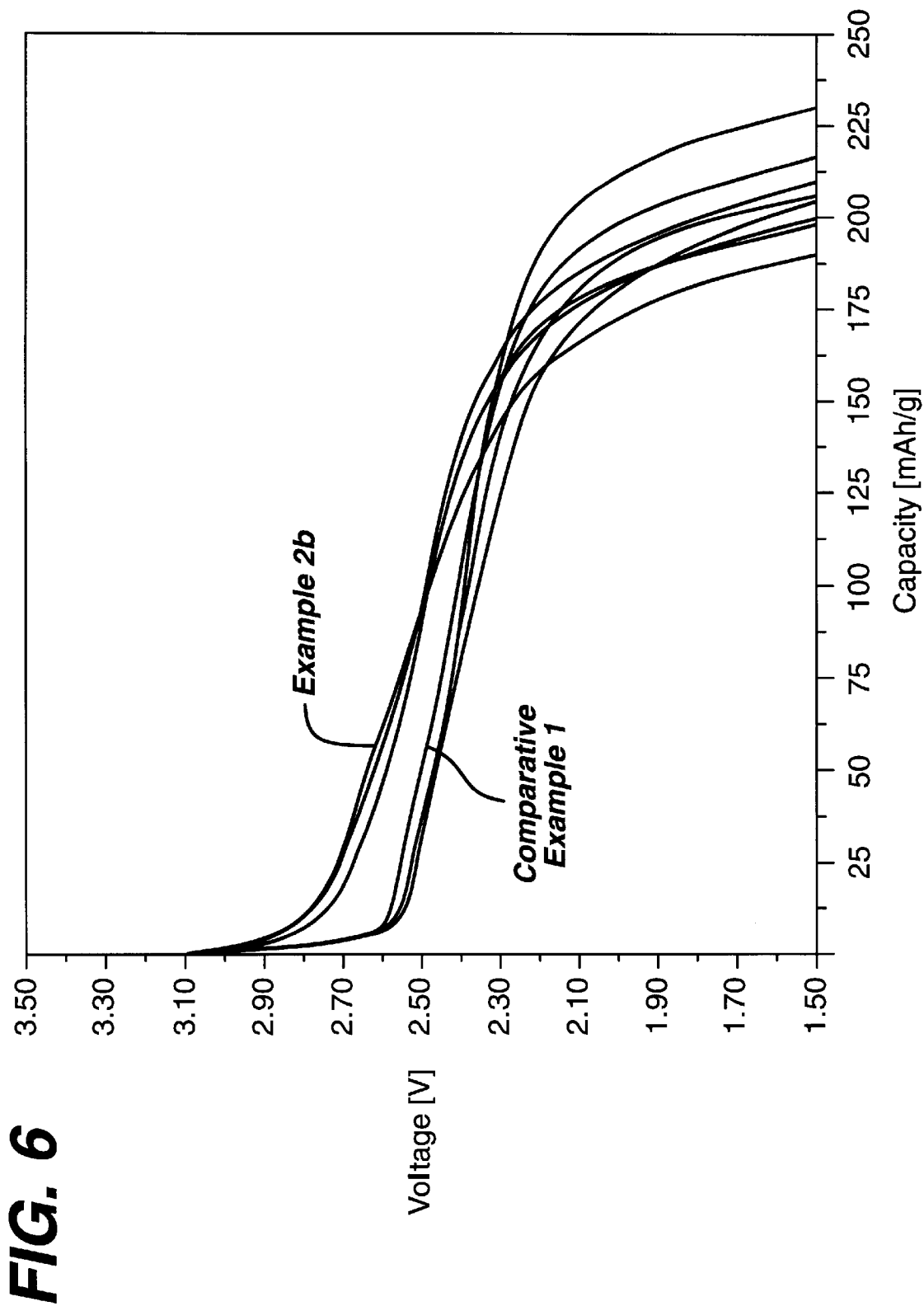
FIG. 6 is a graph depicting the discharge performance at –10° C. for coin cells having cathodes containing lithiated manganese dioxide having a Li/Mn mole ratio of 0.1 or conventionally heat-treated commercial EMD.
Figure 7:
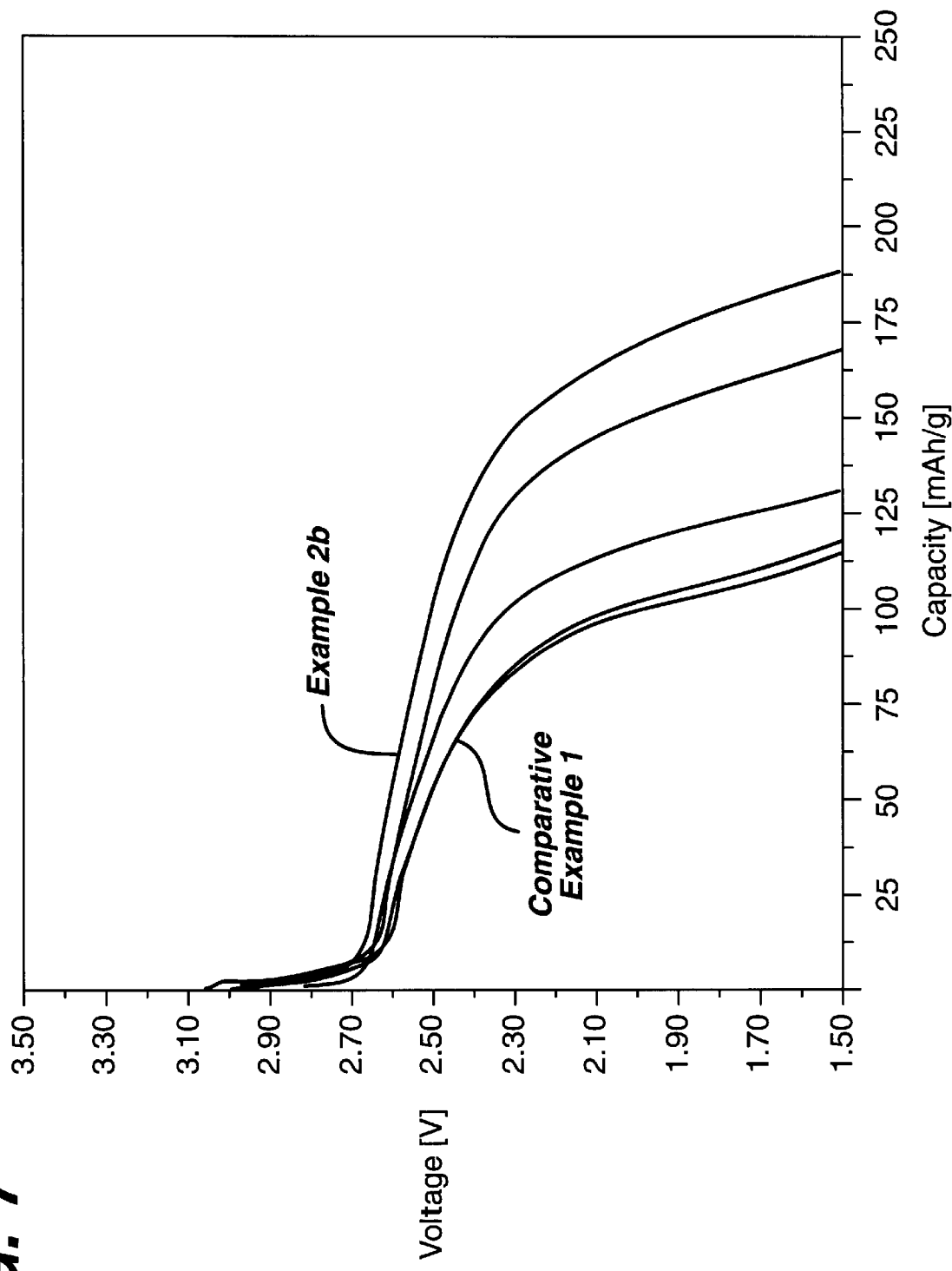
FIG. 7 is a graph depicting the high rate discharge performance for coin cells having cathodes containing a lithiated manganese dioxide having a Li/Mn mole ratio of 0.1 or conventionally heat-treated commercial EMD.

A comparison of the discharge performance for coin cells containing lithiated manganese dioxide of Example 2b at a C/2 discharge rate (i.e., a discharge rate for which the total cell capacity is discharged during a period of 2 hours) and conventionally heat-treated lithium grade EMD of Comparative Example 1 is shown in FIG. 7. A comparison of the discharge performance of coin cells containing the lithiated manganese dioxide of Example 2b and conventionally heat-treated lithium grade EMD of Comparative Example 1 at low temperature (e.g., –10° C.) at a C/10 discharge rate is shown in FIG. 6. Thus, at both high discharge rate and at low temperature, the lithiated manganese dioxide of the present invention provides superior initial and average operating voltages and comparable discharge capacities compared to conventionally heat-treated commercial EMD.

EXAMPLE 5

Figure 8:
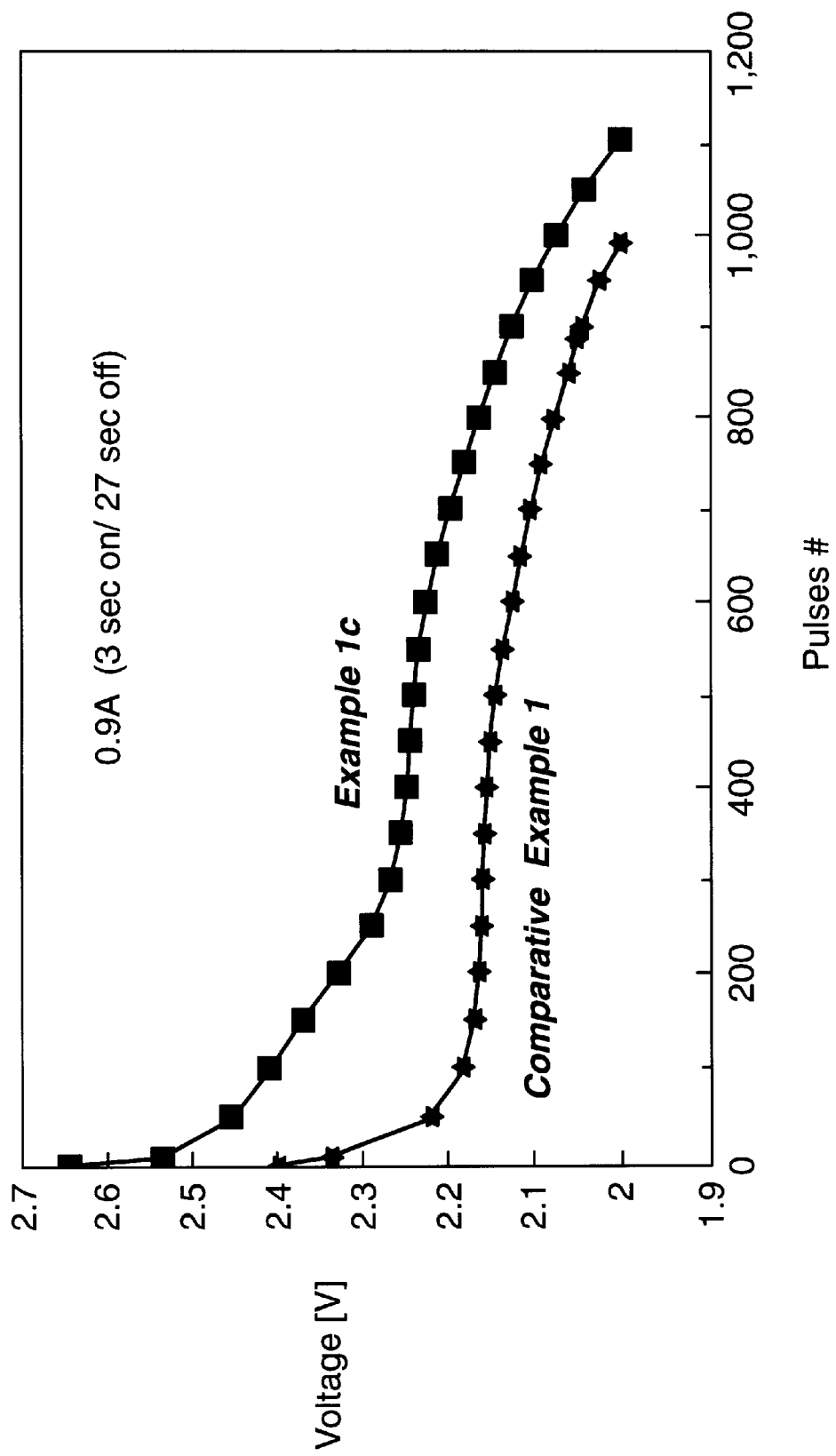
FIG. 8 is a graph depicting the 0.9 ampere pulse discharge performance at –10° C. for 2/3A size lithium cells having cathodes containing either lithiated manganese dioxide from a suspension having a pH value of 11.0 or heat-treated commercial EMD.

Commercial 2/3A-size lithium primary cells (IEC designation "CR17335") were prepared using the heat-treated "lithium grade" EMD of Comparative Example 1 and the lithiated manganese dioxide of Example 1c. All other aspects of the construction of the 2/3A cells excepting the active cathode materials were the same. The 2/3A cells were pulse discharged at a 0.9A discharge rate using a duty cycle consisting of pulsing for 3 seconds on and 27 seconds off at –10° C. to simulate use in a high performance compact camera with the results shown in FIG. 8. The average operating voltage of a 2/3A cell having a cathode containing the lithiated manganese dioxide of Example 1c was consistently higher than that of a 2/3A cell having a cathode containing the conventional heat-treated lithium grade EMD of

COMPARATIVE EXAMPLE 1

Although the present invention was described with respect to specific embodiments, it should be recognized that variations are possible without departing from the concept of the invention. Thus, the invention is not intended to be limited to specific embodiments, but rather its scope is reflected by the claims and equivalents thereof.

What is claimed is:

1. A process for treating manganese dioxide comprising the steps of:
   (a) forming a mixture of manganese dioxide and a liquid;
   (b) adding sufficient amount of a basic lithium salt to said mixture to adjust the pH of said mixture to between about 7.5 and 9 and soaking said mixture for at least about 15 minutes;
   (c) adding a sufficient amount of said basic lithium salt to said mixture to raise the pH of said mixture to between about 10 and 13; and
   (d) allowing said mixture to soak at a temperature between about 15 and 100° C. at said raised pH to form a lithiated manganese dioxide intermediate product having the formula $Li_xMnO_2$, wherein $0.05 \leq x \leq 0.125$; and
   (e) separating said lithiated manganese dioxide intermediate product from said mixture; and
   (f) heating said lithiated manganese dioxide intermediate product at a temperature between about 300 and 420° C. to form a heat-treated lithiated manganese dioxide product having the formula $Li_yMnO_{2-\delta}$, wherein $0.075 \leq y \leq 0.175$ and $0.01 \leq \delta \leq 0.06$, and a predominantly gamma($\gamma$)-$MnO_2$-type crystal structure.

2. The process of claim 1 wherein said heat treated lithiated manganese dioxide product is not a lithium manganese oxide having a spinel type crystal structure detectable by x-ray powder diffraction analysis.

3. A process for treating manganese dioxide comprising the steps of:
   (a) forming a mixture of manganese dioxide and a liquid; and
   (b) adding a sufficient amount of a basic lithium salt to said mixture to adjust the pH of said mixture to between about 7.5 and 9; and
   (c) allowing said mixture to soak at a temperature between about 15 and 35° C. at said pH to neutralize surface acidic sites on said manganese dioxide; and
   (d) adding a sufficient amount of basic lithium salt to said mixture after said soaking to raise the pH of said mixture to between about 10 and 13; and
   (e) allowing said mixture to soak at a temperature between about 15 and 100° C. at said raised pH to form a lithiated manganese dioxide intermediate product having the formula $Li_xMnO_2$, wherein $0.05 \leq x \leq 0.125$; and
   (f) separating said lithiated manganese dioxide intermediate product from said mixture; and
   (g) heating said lithiated manganese dioxide intermediate product at a temperature between about 300 and 420° C. to form a heat-treated lithiated manganese dioxide product having the formula $Li_yMnO_{2-\delta}$, wherein $0.075 \leq y \leq 0.175$ and $0.01 \leq \delta \leq 0.06$, and a predominantly gamma($\gamma$)-$MnO_2$-type crystal structure; and
   (h) inserting said heat-treated lithiated manganese dioxide into a primary lithium electrochemical cell as an active cathode material for said cell.

4. The process of claim 3 wherein said manganese dioxide is an electrolytic manganese dioxide (EMD) having a gamma($\gamma$)-$MnO_2$-type crystal structure.

5. The process of claim 3 wherein said manganese dioxide has a sodium content less than 2000 ppm.

6. The process of claim 3 wherein said liquid is distilled or deionized water.

7. The process of claim 3 wherein said soaking period of step (c) is at least about 15 minutes.

8. The process of claim 3 wherein said soaking period of step (c) is at least about 30 minutes.

9. The process of claim 3 wherein said soaking period in step (c) is between about 10% and 50% of the total soaking period for steps (c) and (e).

10. The process of claim 3 wherein said basic lithium salt can be selected from the group consisting of lithium hydroxide, lithium oxide, lithium methoxide, and lithium amide.

11. The process of claim 3 wherein said basic lithium salt is lithium hydroxide.

12. The process of claim 3 wherein the pH of said mixture of step (b) is between about 7.7 and 9.

13. The process of claim 3 wherein the temperature of the mixture of step (c) is between 20 and 30° C.

14. The process of claim 3 wherein the pH of said mixture of step (d) after soaking is between about 11 and 13.

15. The process of claim 3 wherein the total soaking period for steps (c) and (e) is from about 2 to 24 hours.

16. The process of claim 3 wherein the temperature of the mixture of step (e) is between 20 and 30° C.

17. The process of claim 3 wherein the heating temperature of said lithiated manganese dioxide intermediate in step (g) is between 350 and 390° C.

18. The process of claim 3 wherein said heating of said intermediate product in step (g) is accomplished in an oxidizing atmosphere.

19. The process of claim 18 wherein said oxidizing atmosphere comprises air or oxygen.

20. The process of claim 3 wherein residual water present in said intermediate product from step (f) is removed by the heating in step (g).

21. The process of claim 3 wherein the heat-treated lithiated manganese dioxide product is not a lithium manganese oxide having a spinel type crystal structure detectable by x-ray powder diffraction analysis.

22. The process of claim 3 wherein said primary lithium electrochemical cell includes an anode comprising lithium metal or a lithium alloy.

23. A process for treating manganese dioxide comprising the steps of:
   (a) forming a reaction precursor comprising a blended, dry mixture of manganese dioxide and a low melting point lithium salt mixture, said lithium salt mixture having a melting point less than about 350° C.; and
   (b) heating said reaction precursor in a first step at a temperature between the melting point of said low melting point lithium salt mixture and 350° C. to form a lithiated manganese dioxide intermediate product having the formula $Li_xMnO_2$, wherein $0.05 \leq x \leq 0.175$; and
   (c) heating said intermediate product in a second step at a temperature between about 350 and 420° C. to form heat-treated lithiated manganese dioxide product having the formula $Li_yMnO_{2-\delta}$, wherein $0.05 \leq y \leq 0.175$ and $0.01 \leq \delta \leq 0.06$, and a predominantly gamma($\gamma$)-$MnO_2$-type crystal structure; and
   (d) inserting said heat-treated lithiated manganese dioxide into a primary lithium electrochemical cell as an active cathode material of said cell.

24. The process of claim 23 wherein said heat-treated lithiated manganese dioxide product has an average pore diameter between about 70 and 85 Angstroms.

25. The process of claim 23 wherein said manganese dioxide is an electrolytic manganese dioxide having a gamma($\gamma$)-MnO$_2$-type crystal structure.

26. The process of claim 23 wherein said manganese dioxide has a sodium content less than 2000 ppm.

27. The process of claim 23 wherein said low melting point lithium salt mixture is selected from the group consisting of a low melting point lithium salt, a mixture comprising at least two different low melting point lithium salts, and a a low melting point eutectic mixture of lithium salts.

28. The process of claim 23 wherein said low melting point lithium salt mixture comprises a lithium salt selected from the group consisting of lithium nitrate, lithium perchlorate, lithium bis(trifluoromethylsulfonyl) imide, and lithium tetrafluoroborate, and any mixture thereof.

29. The process of claim 23 wherein said low melting point lithium salt mixture comprises lithium nitrate.

30. The process of claim 23 wherein said reaction precursor formed in step (a) has a Li/Mn$^{+4}$ molar ratio between about 0.05 and 0.175.

31. The process of claim 23 wherein said heating in step (b) is for a period of between 2 and 12 hours.

32. The process of claim 23 wherein said heating of said intermediate product in step (c) is accomplished in an oxidizing atmosphere.

33. The process of claim 32 wherein said oxidizing atmosphere comprises air or oxygen.

34. The process of claim 23 wherein said heating of step (c) is for a period of between 4 and 12 hours.

35. The process of claim 23 wherein any residual water present in said intermediate product from step (b) is removed by the heating in step (c).

36. The process of claim 23 wherein said heat-treated lithiated manganese dioxide product has a total lithium content between 0.4 and 1.3% lithium by weight.

37. The process of claim 23 wherein said primary lithium cell includes an anode comprising lithium metal or a lithium alloy.

* * * * *

UNITED STATES PATENT AND TRADEMARK OFFICE
Certificate

Patent No. 6,190,800 B1                                                                                              Patented: February 20, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Nikolay Iitchev, Norfolk, MA; Paul A. Christian, Norton, MA; William L. Bowden, Nashua, NH; Peter R. Moses, Windham, NH; Klaus Brandt, Wellesley, MA and Radek Fooksa, Needham, MA.

Signed and Sealed this Twenty-sixth Day of March 2002.

D. GABRIELLE BROUILLETTE
*Supervisory Patent Examiner*
Art Unit 1745